US012641325B2

(12) United States Patent
Rajanna et al.

(10) Patent No.: US 12,641,325 B2
(45) Date of Patent: May 26, 2026

(54) METHODS AND SYSTEMS FOR MODIFYING A MEDIA CONTENT ITEM BASED ON USER REACTION

(71) Applicant: Adeia Guides Inc., San Jose, CA (US)

(72) Inventors: VasanthRaj Rajanna, Bengaluru (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 8 days.

(21) Appl. No.: 18/744,120

(22) Filed: Jun. 14, 2024

(65) Prior Publication Data

US 2025/0119628 A1     Apr. 10, 2025

Related U.S. Application Data

(63) Continuation of application No. 17/397,342, filed on Aug. 9, 2021, now Pat. No. 12,041,323.

(51) Int. Cl.
| | |
|---|---|
| *H04N 21/8545* | (2011.01) |
| *H04N 21/431* | (2011.01) |
| *H04N 21/442* | (2011.01) |
| *H04N 21/475* | (2011.01) |
| *H04N 21/482* | (2011.01) |
| *H04N 21/488* | (2011.01) |

(52) U.S. Cl.
CPC ..... *H04N 21/8545* (2013.01); *H04N 21/4312* (2013.01); *H04N 21/44218* (2013.01); *H04N 21/4756* (2013.01); *H04N 21/4826* (2013.01); *H04N 21/4882* (2013.01)

(58) Field of Classification Search
CPC .......... H04N 21/8545; H04N 21/4312; H04N 21/44218; H04N 21/4756; H04N 21/4826; H04N 21/4882; H04N 21/4661; H04N 21/4667; H04N 21/4668; H04N 21/8541; H04N 21/816

USPC ......................................................... 725/14
See application file for complete search history.

(56) References Cited

U.S. PATENT DOCUMENTS

| | | | |
|---|---|---|---|
| 8,640,021 | B2 | 1/2014 | Perez et al. |
| 10,271,087 | B2 | 4/2019 | Klappert et al. |
| 10,289,733 | B2 | 5/2019 | Carmichael et al. |
| 10,298,979 | B2 * | 5/2019 | Waisanen ............. H04N 21/251 |
| 10,594,757 | B1 | 3/2020 | Shevchenko et al. |
| 10,951,949 | B2 | 3/2021 | Siddiq et al. |
| 10,958,973 | B2 | 3/2021 | Hoots et al. |
| 11,290,762 | B2 * | 3/2022 | Christie ............. H04N 21/2541 |
| 11,980,484 | B2 * | 5/2024 | Shouldice ............ A61B 5/7275 |
| 12,026,422 | B2 * | 7/2024 | Chandrashekar ..... G06F 3/1462 |
| 12,041,323 | B2 | 7/2024 | Rajanna et al. |
| 2009/0112617 | A1 | 4/2009 | Jung et al. |

(Continued)

OTHER PUBLICATIONS

Affectiva, "Finding the Essence of Fear in Nevermind" https://blog.affectiva.com/finding-the-essence-of-fear-in-nevermind (2016) retrieved from Internet Jan. 25, 2024.

(Continued)

*Primary Examiner* — Sahar Aqil Riaz
(74) *Attorney, Agent, or Firm* — HG LAW LLP

(57) ABSTRACT

Systems and methods are described for modifying the content of a media content item. A a media content item is displayed on user equipment. A user reaction to one or more portions of the media content item is determined. The content of the media content item is modified based on the user reaction to one or more portions of the media content item.

18 Claims, 12 Drawing Sheets

(56) References Cited

U.S. PATENT DOCUMENTS

| | | | |
|---|---|---|---|
| 2011/0105857 A1 | 5/2011 | Zhang et al. | |
| 2011/0161999 A1* | 6/2011 | Klappert | H04N 21/4318 |
| | | | 382/201 |
| 2011/0245633 A1* | 10/2011 | Goldberg | A61B 5/165 |
| | | | 600/323 |
| 2012/0072938 A1 | 3/2012 | Seong et al. | |
| 2012/0178529 A1 | 7/2012 | Collard et al. | |
| 2015/0067708 A1 | 3/2015 | Jensen et al. | |
| 2015/0157259 A1 | 6/2015 | Bradu | |
| 2016/0034468 A1 | 2/2016 | Hart et al. | |
| 2016/0066036 A1 | 3/2016 | Felt et al. | |
| 2016/0081607 A1* | 3/2016 | el Kaliouby | G16H 40/67 |
| | | | 434/236 |
| 2016/0156951 A1 | 6/2016 | Perinchery et al. | |
| 2017/0099519 A1 | 4/2017 | Dang et al. | |
| 2017/0129335 A1 | 5/2017 | Lu et al. | |
| 2017/0214852 A1 | 7/2017 | Yoon et al. | |
| 2017/0374414 A1* | 12/2017 | Knox | H04N 21/41407 |
| 2018/0005272 A1 | 1/2018 | Todasco et al. | |
| 2018/0053197 A1 | 2/2018 | Chan et al. | |
| 2018/0249209 A1 | 8/2018 | Dey et al. | |
| 2018/0249215 A1 | 8/2018 | Wilkinson | |
| 2018/0367494 A1 | 12/2018 | Skeene | |
| 2018/0376187 A1* | 12/2018 | Everett | H04N 21/42202 |
| 2019/0098370 A1 | 3/2019 | Laeuchli et al. | |
| 2019/0230411 A1* | 7/2019 | Durham | H04N 21/45455 |
| 2019/0373330 A1 | 12/2019 | Bloch et al. | |
| 2020/0054128 A1 | 2/2020 | Gilbert et al. | |
| 2020/0193068 A1 | 6/2020 | Jones | |
| 2020/0273485 A1 | 8/2020 | Jagmag et al. | |
| 2020/0274838 A1* | 8/2020 | Hildebrand | G06F 40/30 |
| 2020/0296480 A1* | 9/2020 | Chappell, III | H04H 60/33 |
| 2021/0219023 A1 | 7/2021 | Sheng et al. | |
| 2021/0374193 A1 | 12/2021 | Aher et al. | |
| 2021/0405743 A1 | 12/2021 | Boesel et al. | |
| 2022/0269335 A1 | 8/2022 | Perez-Rua et al. | |
| 2023/0038347 A1 | 2/2023 | Rajanna et al. | |

OTHER PUBLICATIONS

"International Search Report and Written Opinion", issued in Int'l. App. No. PCT/US2021/063826, Jul. 1, 2022.

* cited by examiner

Fig. 7A

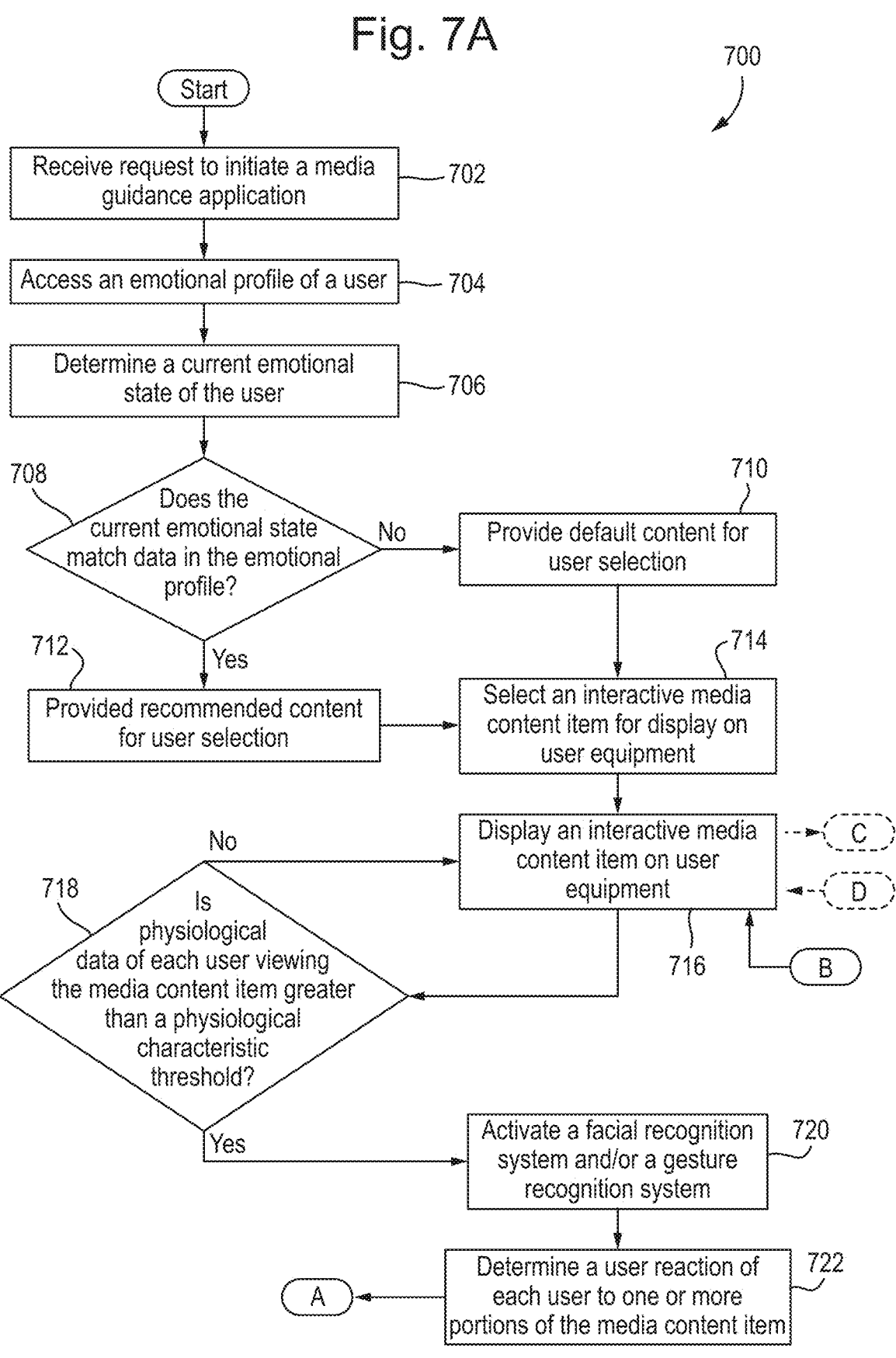

700

Start

Receive request to initiate a media guidance application —702

Access an emotional profile of a user —704

Determine a current emotional state of the user —706

708

Does the current emotional state match data in the emotional profile?

710

No → Provide default content for user selection

712

Yes

Provided recommended content for user selection

714

Select an interactive media content item for display on user equipment

Display an interactive media content item on user equipment - - → C

- - D

716

B

718

No

Is physiological data of each user viewing the media content item greater than a physiological characteristic threshold?

Yes

Activate a facial recognition system and/or a gesture recognition system —720

Determine a user reaction of each user to one or more portions of the media content item —722

Figure 9:
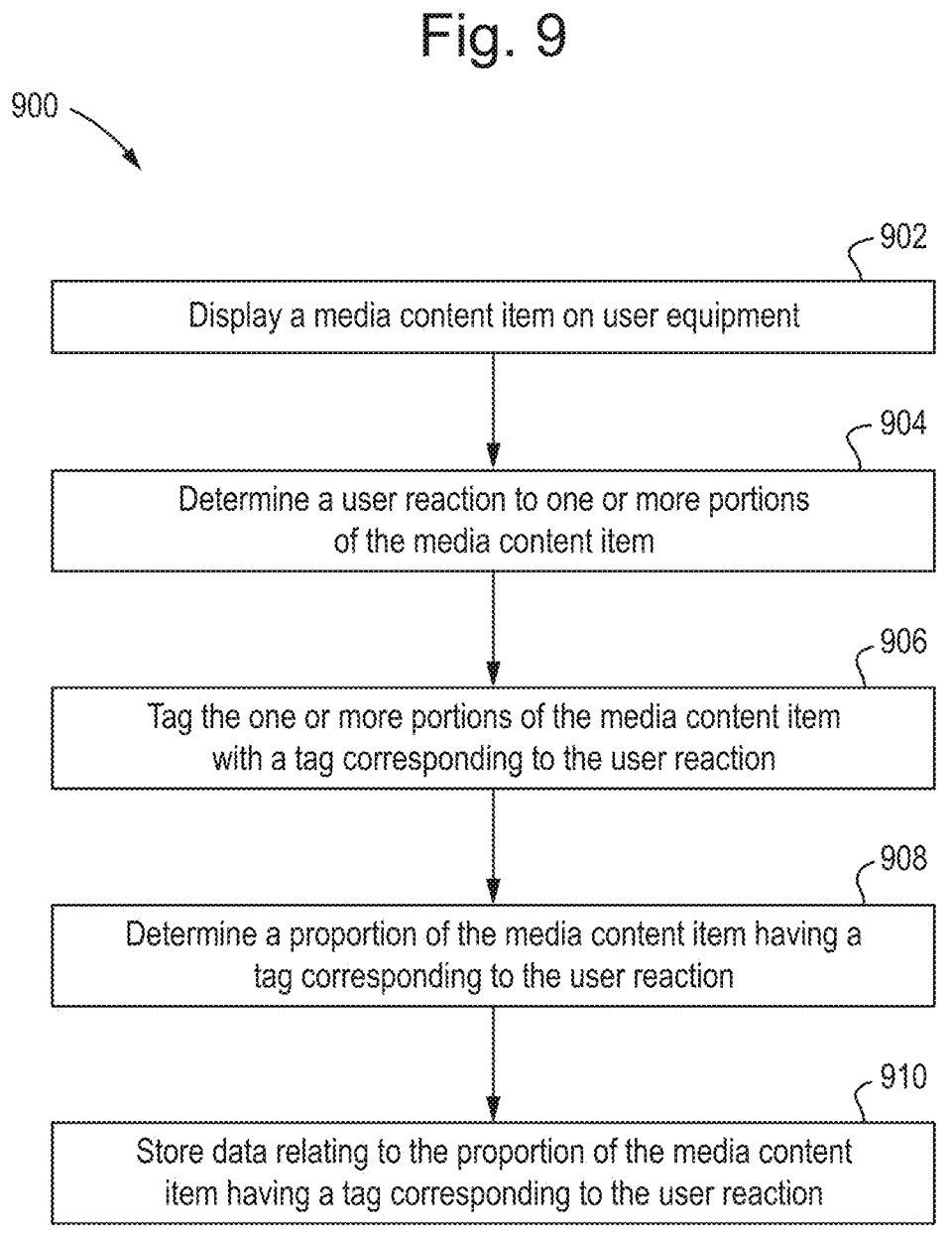

Display a media content item on user equipment

904

Determine a user reaction to one or more portions
of the media content item

906

Tag the one or more portions of the media content item
with a tag corresponding to the user reaction

908

Determine a proportion of the media content item having a
tag corresponding to the user reaction

910

Store data relating to the proportion of the media content
item having a tag corresponding to the user reaction

1000

METHODS AND SYSTEMS FOR MODIFYING A MEDIA CONTENT ITEM BASED ON USER REACTION

CROSS-REFERENCE TO RELATED APPLICATIONS

This application is a continuation of U.S. patent application Ser. No. 17/397,342, filed Aug. 9, 2021, which is hereby incorporated by reference herein in its entirety.

BACKGROUND

The present disclosure relates to methods and systems for determining a user reaction to a media content item and modifying a media content item based on user reaction. Particularly, but not exclusively, the present disclosure relates to monitoring a user's physiological data to determine a user reaction to a media content item and modifying playback of the media content item based on the user reaction and/or generating an interactive user review based on the user reaction.

SUMMARY

The general concept of monitoring a viewer's reactions while consuming video content has been around for a while. For example, a facial recognition system, e.g., a system that uses an infrared camera in combination with image processing techniques, can capture images of audience faces and analyze the images to determine how many audience members were happy, how many laughed, how many seemed bored, etc., while viewing the video content. Other systems rely on monitoring brain signals, e.g., using electroencephalography, to detect a viewer's emotional state. However, such systems have been used previously to provide retrospective analysis of how an audience reacted to media content.

Nowadays, with the advent of over-the-top applications, for example, service providers can provide a user with interactive programming that allows the user to make choices that determine the plot of a media content item, e.g., by making choices for a character in the interactive media content item. As such, it is desirable to understand how the user is reacting to a plot, in order to improve the delivery of the interactive programming to the user.

Systems and methods are provided herein for determining a user reaction to a media content item and modifying the media content item, e.g., in real time. Such systems and methods may provide an improved viewing experience for the user, e.g., by automatically selecting one or more options for progressing in an interactive media content item. Systems and methods are provided herein for determining a user reaction to a media content item and storing data related to the user reaction. Such data can be used to tag one or more portions of a media content item as relating to a particular type of user reaction. The systems and methods provided herein may make use of such tags to modify the content of a media content item and/or generate an interactive review of a media content item, e.g., to deliver an improved user experience to the viewer and/or a potential viewer of the media content item.

According to some examples of the systems and methods provided herein, a media content item is displayed on user equipment. At least one user reaction, e.g., a physical, a physiological and/or psychological user reaction, to one or more portions of the media content item is determined. The content of the media content item, e.g., a plot of the media content item, is modified based on the user reaction to one or more portions of the media content item, e.g., during the display of the media content item on the user equipment.

According to some examples of the systems and methods provided herein, a media content item is played on user equipment. A user reaction to one or more portions of the media content item is determined. The one or more portions of the media content item are tagged with a tag corresponding to the user reaction. A proportion of the media content item having a tag corresponding to the user reaction is determined. Data relating to the proportion of the media content item having a tag corresponding to the user reaction is stored, e.g., in a database. In some examples, the stored data relating to a user reaction to a media content item may be used to generate an interactive review for the media content item.

In some examples, determining the user reaction comprises measuring and/or monitoring one or more physiological characteristics of a user viewing the media content item, e.g., using a wearable device of the user. Physiological characteristics may include data relating to at least one of heart rate, blood glucose, blood pressure, respiration rate, body temperature, blood volume, sound pressure, photoplethysmography, electroencephalogram, electrocardiogram, blood oxygen saturation, skin conductance, and/or any other appropriate physiological characteristic.

In some examples, determining the user reaction comprises determining and/or monitoring one or more facial expressions of the user and/or one or more gestures of the user, e.g., using a facial recognition system. A facial expression of the user may include a smile, a frown, a laugh, etc.

In some examples, determining the user reaction comprises determining and/or monitoring one or more gestures of the user, e.g., using a gesture recognition system. A gesture of the user may include the user covering at least a portion of their face, the user turning at least partially away from the screen, and/or any other appropriate gesture that a user may make while viewing a media content item.

In some examples, determining the user reaction comprises activating the facial recognition system and/or the gesture recognition system in response to determining a change in the physiological characteristic of the user. For example, data relating to one or more physiological characteristics may be monitored to determine a change in one or more physiological characteristic of the user, e.g., above a predetermined physiological characteristic threshold. In some examples, the predetermined physiological characteristic threshold may be different for different users, e.g., based on their watch history, historical physiological data, program content options selected while viewing an interactive media content item, etc. In some examples, the predetermined physiological characteristic threshold may change, e.g., go up and down, as the user consumes more content and more physiological data is collected over time.

In some examples, the media content item is an interactive media content item, e.g., a media content item having a plurality of program content options available for viewing by a user, such as program content options that enable a user to make choices for a character in the media content item. In some examples, modifying the media content item comprises selecting one of the plurality of program content options in response to determining the user reaction. In some examples, selection of the program content option may be based on metadata and/or one or more tags of the media content item. In some examples, selection of the program content option may be based on one or more tags relating to the determined user reaction.

In some examples, modifying the media content item comprises reducing the number of the plurality of program content options available for selection, e.g., based on the determined user reaction. For example, the number of program content options available for selection may be reduced by removing program content options relating to a type of content, such as extreme content, and/or a genre of content.

In some examples, one or more tags relating to the content of at least one of the plurality of program content options available for viewing by the user are identified. For example, a tag of a program content option may be based on metadata for the media content item. In some examples, a tag of a program content option may be generated by one or more users who have previously viewed the media content item, e.g., a tag of a program content option may be generated based on a user reaction of a user who has previously viewed the media content item.

In some examples, one of the plurality of program content options is selected for viewing, e.g., as a most suitable option for a user who is currently viewing the media content item. For example, a program content option may be selected based on the one or more tags of the program content option, the determined user reaction, and/or user viewing history. In some examples, a program content option may be selected based on a correlation between one or more tags of the program content option and the determined user reaction and/or user viewing history.

In some examples, selecting one of the plurality of program content options available for viewing by the user comprises generating, for display, a list of user-selectable display icons corresponding to the plurality of program content options available for viewing by the user. The list may be ordered/ranked based on the one or more tags, the determined user reaction, and/or user viewing history. In some examples, a user selection of one of the user-selectable display icons is received, and the program content option corresponding to the selected display icon is displayed to the user.

In some examples, a message relating to the content of at least one of the plurality of program content options available for viewing by the user is generated, e.g., based on the determined user reaction and/or one or more of the determined tags. For example, a warning message may be generated to indicate to the user that one of the program content options available for viewing by the user contains content that may exacerbate the determined user reaction.

In some examples, the one or more tags relating to the content of a program content option available for viewing by the user are based on one or more user reactions of at least one other user that has previously viewed one or more portions of the media content item.

In some examples, determining the user reaction comprises identifying a user reaction to one or more portions of the media content item, e.g., based on a determined change in a physiological characteristic of a user being greater than a physiological characteristic threshold. In some examples, a user selection of the type of user reaction is requested, e.g., to confirm the type of user reaction that has been identified.

In some examples, determining the proportion of the media content item having a tag relating to a user reaction, e.g., a type of user reaction, comprises requesting user adjustment and/or confirmation of the proportion of the media content item having a tag relating to the user reaction. In some examples, in response to receiving user adjustment and/or confirmation of the proportion of the media content item having a tag relating to the user reaction, the user is provided with access to the portion of the media content item with a tag relating to the user reaction.

In some examples, a database comprising data relating to the proportion of the media content item having a tag relating to the user reaction is generated. In some examples, a graphical representation, e.g., a summary chart, of the proportion of the media content item having a tag relating to the user reaction is generated, e.g., based on data stored in the database. In some examples, the graphical representation comprises one or more user-selectable display elements, each relating to a different type of user reaction. In some examples, a user input selecting a user-selectable display element is received. In response to receiving the user selection, a portion of the media content item having a tag corresponding to the type user reaction relating to the selected display element is displayed to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7A is a flowchart representing process for process for modifying the content of an interactive media content item, in accordance with some examples of the disclosure;

FIG. 9 is a flowchart representing process for process for storing data relating to a user reaction to a media content item, in accordance with some examples of the disclosure;

DETAILED DESCRIPTION

Figure 1:
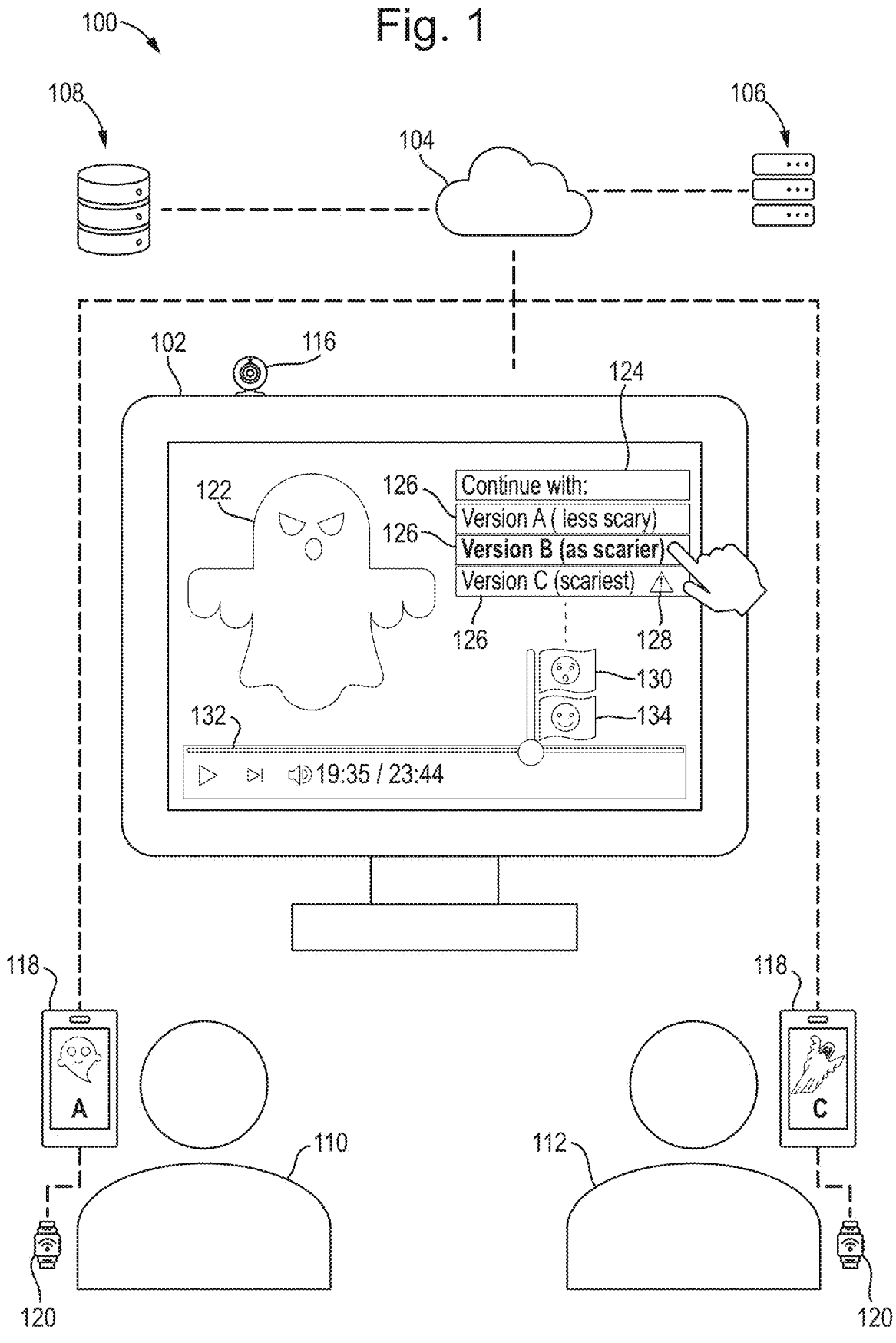
FIG. 1 illustrates an overview of a system for modifying the content of a media content item based on a user reaction, in accordance with some examples of the disclosure.
Figure 2:
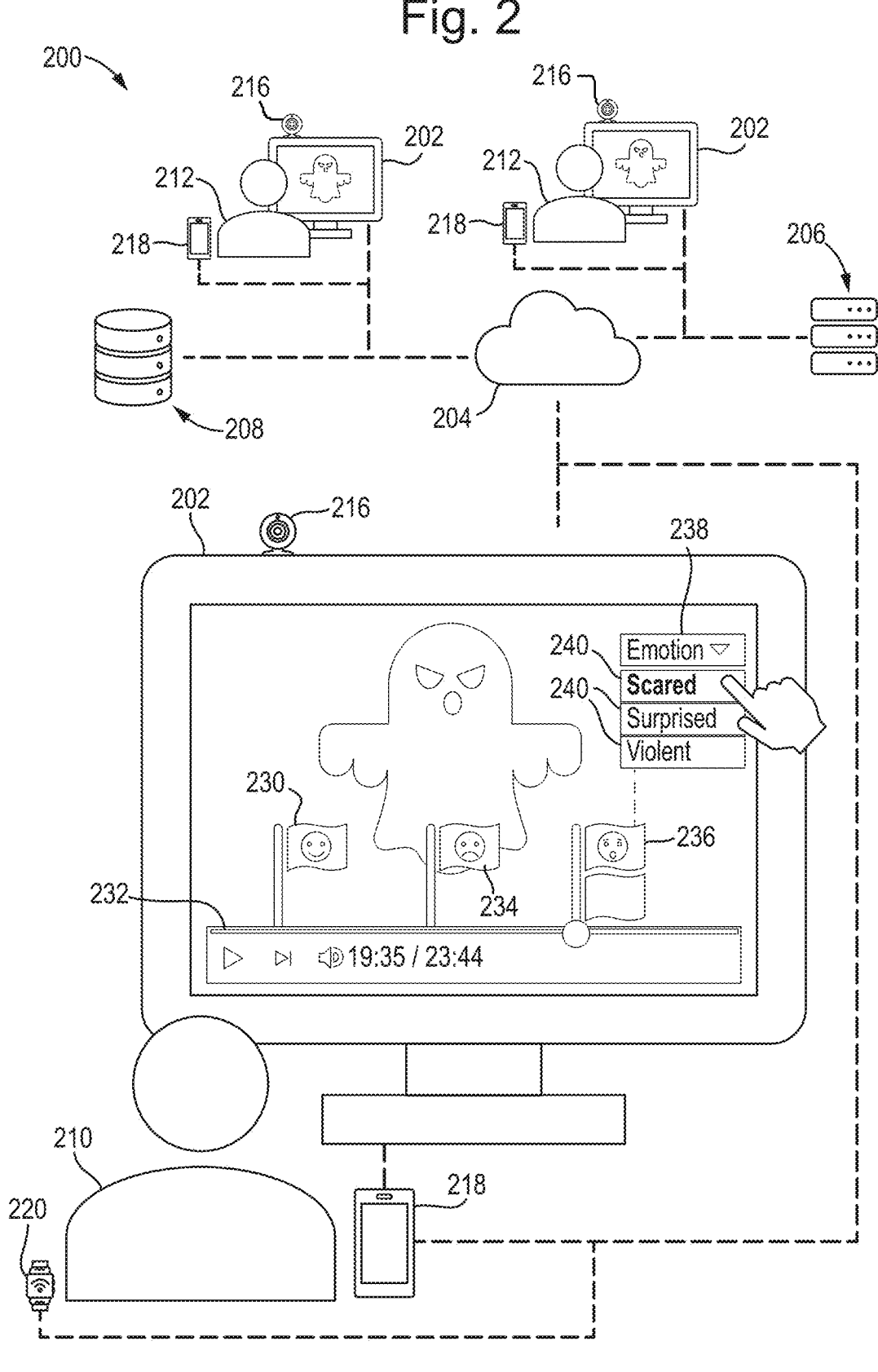
FIG. 2 illustrates an overview of a system for storing data relating to a user reaction to a media content item, in accordance with some examples of the disclosure.
Figure 3:
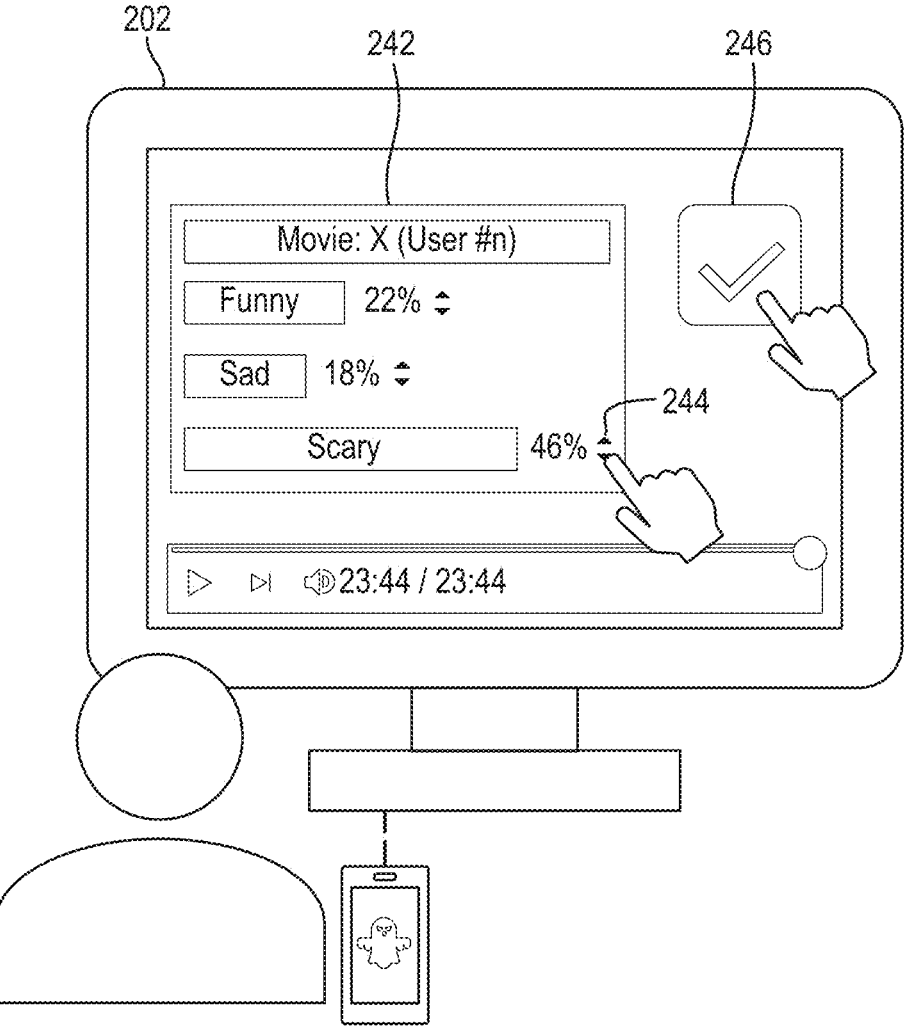
FIG. 3 illustrates an overview of a system for storing data relating to a user reaction to a media content item, in accordance with some examples of the disclosure.

FIG. 1 illustrates an overview of a system 100 for modifying the content of a media content item, e.g., by selecting one or more alternative programming options, in accordance with some examples of the disclosure. FIGS. 2-4 illustrate an overview of a system 200 for storing data relating to one or more user reactions to a media content item, in accordance with some examples of the disclosure. In particular, FIGS. 3 and 4 illustrate how the data relating to one or more user reactions to a media content item can be used to generate an interactive review for the media content item, e.g., using system 200.

In some examples, systems 100, 200 each include a user device 102, 202, such as a tablet computer, a smartphone, a smart television, or the like, configured to display media content to one or more users. Systems 100, 200 may also each include network 104, 204 such as the Internet, configured to communicatively couple the user device 102, 202 to one or more servers 106, 206 and/or one or more content databases 108, 208 from which media content may be obtained for display on the user device 102, 202. User device 102, 202 and server 106, 206 may be communicatively coupled to one another by way of network 104, 204 and server 106, 206 may be communicatively coupled to content database 108, 208 by way of one or more communication paths, such as a proprietary communication path and/or network 104, 204.

In some examples, systems 100, 200 may each comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g., based on the reactions of one or more users that have previously watched the content item. For example, the application may provide a user who has just watched a media content item with a selectable option for inputting/confirming a type of reaction, e.g., laugher, sadness, etc., to a particular portion of the media content item.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
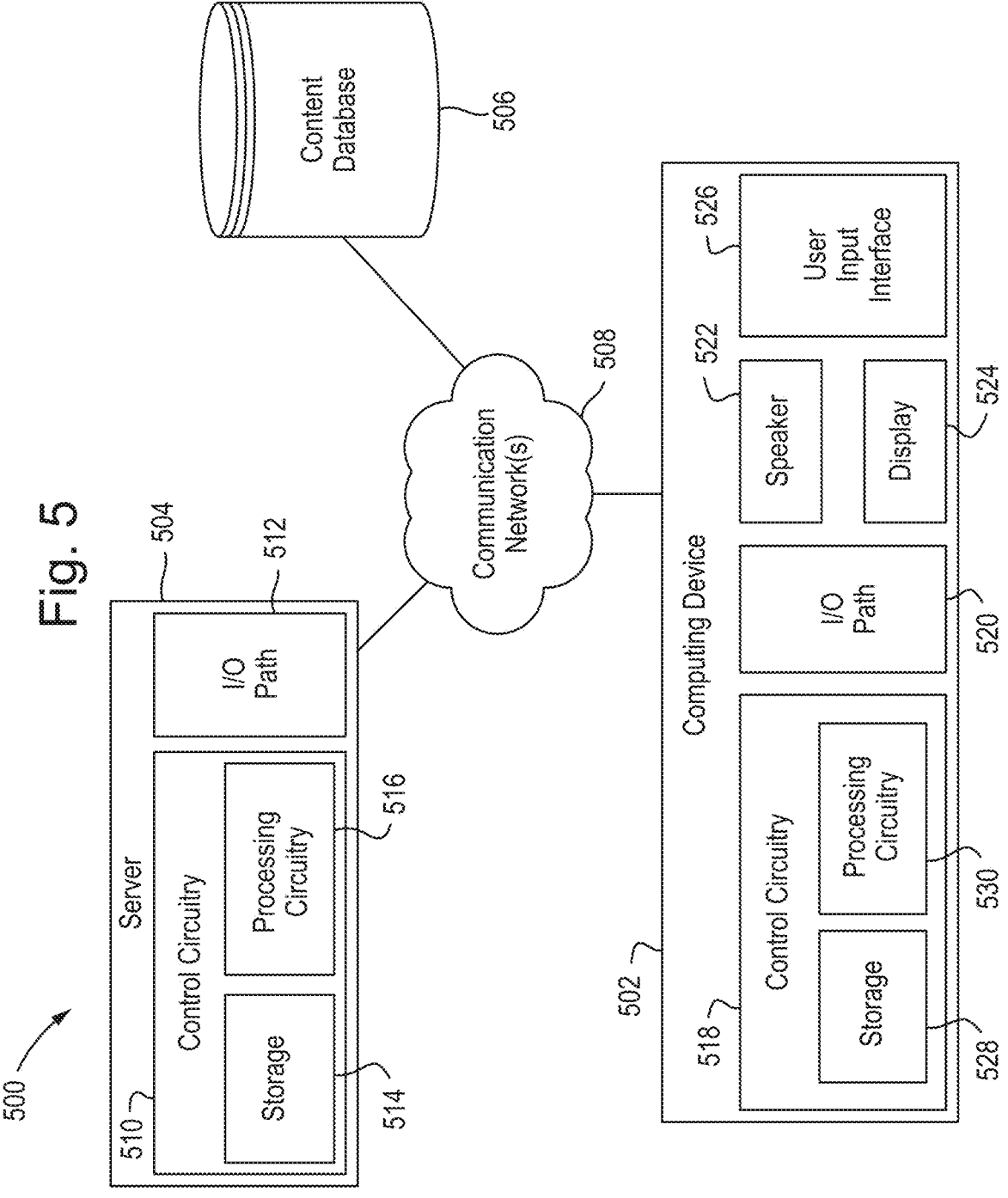
FIG. 5 is a block diagram showing components of an exemplary system for modifying the content of a media content item based on a user reaction and/or storing data relating to a user reaction to a media content item, in accordance with some examples of the disclosure.

FIG. 5 is an illustrative block diagram showing exemplary system 500 configured to display media content. Although FIG. 5 shows system 500 as including a number and configuration of individual components, in some examples, any number of the components of system 500 may be combined and/or integrated as one device, e.g., as user device 102. System 500 includes computing device 502, server 504, and content database 506, each of which is communicatively coupled to communication network 508, which may be the Internet or any other suitable network or group of networks. In some examples, system 500 excludes server 504, and functionality that would otherwise be implemented by server 504 is instead implemented by other components of system 500, such as computing device 502. In still other examples, server 504 works in conjunction with computing device 502 to implement certain functionality described herein in a distributed or cooperative manner.

Server 504 includes control circuitry 510 and input/output (hereinafter "I/O") path 512, and control circuitry 510 includes storage 514 and processing circuitry 516. Computing device 502, which may be a personal computer, a laptop computer, a tablet computer, a smartphone, a smart television, a smart speaker, or any other type of computing device, includes control circuitry 518, I/O path 520, speaker 522, display 524, and user input interface 526, which in some examples provides a user selectable option for enabling and disabling the display of modified subtitles. Control circuitry 518 includes storage 528 and processing circuitry 530. Control circuitry 510 and/or 518 may be based on any suitable processing circuitry such as processing circuitry 516 and/or 530. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 514, storage 528, and/or storages of other components of system 500 (e.g., storages of content database 506, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 514, storage 528, and/or storages of other components of system 500 may be used to store various types of content, metadata, and or other types of data. Non-volatile memory may also be used (e.g., to launch a boot-up routine and other instructions). Cloud-based storage may be used to supplement storages 514, 528 or instead of storages 514, 528. In some examples, control circuitry 510 and/or 518 executes instructions for an application stored in memory (e.g., storage 514 and/or 528). Specifically, control circuitry 514 and/or 528 may be instructed by the application to perform the functions discussed herein. In some implementations, any action performed by control circuitry 514 and/or 528 may be based on instructions received from the application. For example, the application may be implemented as software or a set of executable instructions that may be stored in storage 514 and/or 528 and executed by control circuitry 514 and/or 528. In some examples, the application may be a client/server application where only a client application resides on computing device 502, and a server application resides on server 504.

The application may be implemented using any suitable architecture. For example, it may be a stand-alone application wholly implemented on computing device 502. In such an approach, instructions for the application are stored locally (e.g., in storage 528), and data for use by the application is downloaded on a periodic basis (e.g., from an out-of-band feed, from an Internet resource, or using another suitable approach). Control circuitry 518 may retrieve instructions for the application from storage 528 and process the instructions to perform the functionality described herein. Based on the processed instructions, control circuitry 518 may determine what action to perform when input is received from user input interface 526.

In client/server-based examples, control circuitry 518 may include communication circuitry suitable for communicating with an application server (e.g., server 504) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 508). In another example of a client/server-based application, control circuitry 518 runs a web browser that interprets web pages provided by a remote server (e.g., server 504). For example, the remote server may store the instructions for the application in a storage device. The remote server may process the stored instructions using circuitry (e.g., control circuitry 510) and/or generate displays. Computing device 502 may receive the displays generated by the remote server and may display the content of the displays locally via display 524. This way, the processing of the instructions is performed remotely (e.g., by server 504) while the resulting displays, such as the display windows described elsewhere herein, are provided locally on computing device 502. Computing device 202 may receive inputs from the user via input interface 526 and transmit those inputs to the remote server for processing and generating the corresponding displays.

A user may send instructions, e.g., to view an interactive media content item and/or select one or more programming options of the interactive media content item, to control circuitry 510 and/or 518 using user input interface 526. User input interface 526 may be any suitable user interface, such as a remote control, trackball, keypad, keyboard, touchscreen, touchpad, stylus input, joystick, voice recognition interface, gaming controller, or other user input interfaces. User input interface 526 may be integrated with or combined with display 524, which may be a monitor, a television, a liquid crystal display (LCD), an electronic ink display, or any other equipment suitable for displaying visual images.

Server 504 and computing device 502 may transmit and receive content and data via I/O path 512 and 520, respectively. For instance, I/O path 512 and/or I/O path 520 may include a communication port(s) configured to transmit and/or receive (for instance to and/or from content database 506), via communication network 508, content item identifiers, content metadata, natural language queries, and/or other data. Control circuitry 510, 518 may be used to send and receive commands, requests, and other suitable data using I/O paths 512, 520.

Figure 6:
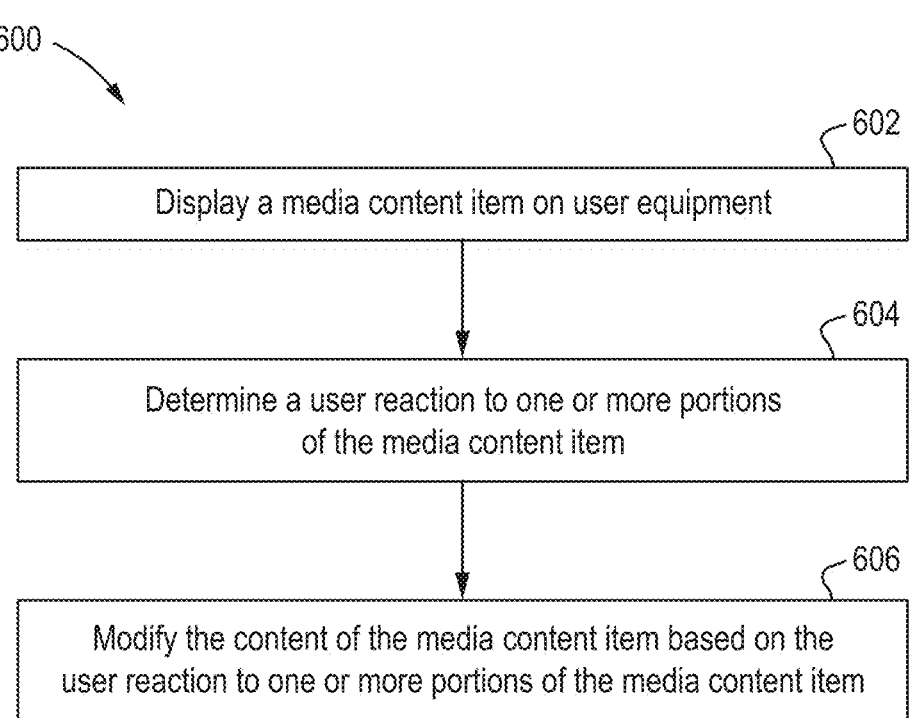
FIG. 6 is a flowchart representing a process for modifying the content of a media content item, in accordance with some examples of the disclosure.

FIG. 6 is a flowchart representing an illustrative process 600 for modifying the content of a media content item, in accordance with some examples of the disclosure. While the example shown in FIG. 6 refers to the use of system 100, as shown in FIG. 1, it will be appreciated that the illustrative process shown in FIG. 6, and any of the other following illustrative processes, may be implemented on system 100, system 200, system 500, either alone or in any combination, and/or on any other appropriately configured system architecture.

At step 602, a media content item, e.g., an interactive media content item, is displayed at user device 102, e.g., using control circuitry. For example, control circuitry may be configured to allow a user 110 to select and view the media content item using a content guidance application, e.g., as part of a communal watching session. In the example shown in FIG. 1, user 110 and user 112 are participating in a communal watching session in which they have chosen to view a movie comprising a scary scene. However, the media content item may comprise any type of audio and/or visual media content. For example, the media content item may be a transmission of a live event, such as a football game, or an audio recording of a concert. In particular, the media content item may be an interactive media content item, e.g., a media content item having selectable programming options that define the plot of the media content item.

At step 604, control circuitry determines a user reaction to one or more portions of the media content item. For example, user device 102 may comprise a camera 116, e.g., an infrared high-resolution camera, configured to capture one or more images of the audience (e.g., user 110 and user 112) viewing the media content item. Additionally or alternatively, the one or more images of the audience may be captured using a camera of a mobile device 118 of a user, e.g., using a forward-facing camera of a smartphone, where a user is viewing the media content item on user device 102 whilst using the mobile device 118. Control circuitry may be configured to analyse one or more captured images to determine an emotional reaction of a user. For example, control circuitry may use one or more facial feature emotion recognition algorithms to determine an emotional reaction of a user, based on an image and/or video of the user captured while the user is watching the media content item. In some examples, physiological data of the user may be used to determine a user reaction, either alone or in combination with one or more image processing techniques. For example, physiological data, such as heart rate data, collected from a wearable device 120 of a user maybe used to help determine a user reaction. For example, the wearable device 120 may determine that user 110 is scared based on measuring a change in the heart rate of user 110. In some examples, control circuitry may access historic data relating to the user's heart rate measured during the previously viewed media content, and compare a current measurement of the user's heart rate, or change in heart rate, to the historic data (e.g., to a heart rate signature). For example, the historic data may contain information, e.g., tags, relating to how a user's reaction corresponds to their heart rate, so that newly measured heart rate data can be mapped onto an existing heart rate signature that indicates how the user responded/reacted to a particular type of scene of a media content item. In some examples, a facial feature emotion recognition system may be triggered in response to a measured change in heart rate, to help determine the type of user reaction corresponding to the change in the user's measured heart rate. For example, a change in the user's heart rate may be caused by the user laughing, or it could be because the user is afraid, etc. As such, control circuitry may activate a facial feature emotion recognition system to determine the type of user reaction that corresponds to the measured change in heart rate. In some examples, control circuitry may request input from the user to confirm that the determined reaction is the correct type of reaction, e.g., where the facial feature emotion recognition system was not able to capture a clear image of the user's face. Upon determination of the user's reaction, e.g., upon determination of which type of reaction corresponds to a particular heart rate signature, control circuitry may store such determination for future use, e.g., so that a subsequent heart rate measurement can be mapped onto an existing heart rate signature that indicates how the user responded/reacted to a particular type of scene of a media content item. In this manner, system 100 may learn what a particular physiological measurement means, such that a facial feature emotion recognition system need not be activated every time a change in the user's physiological data is determined. In the example shown in FIG. 1, each user 110, 112 has a wearable device 120 operatively connected to respective mobile devices 118. However, in some examples, wearable device 120 may be connected directly to network 104.

At step 606, control circuitry modifies the content of the media content item based on the user reaction to one or more portions of the media content item. For example, where it has been determined that the user is scared by the media content item that they are viewing, control circuitry may modify the content of the media content item in an appropriate manner. In some examples, a user profile may indicate that a user enjoys being scared, and, as such, control circuitry may modify the media content item to include one or more additional portions of scary content that was not included as part of an original version of the media content item (e.g., as part of the default content of the media content item). In some examples, a user profile may indicate that the user does not enjoy being scared, and, as such, control circuitry may modify the media content item to remove or censor, e.g., obscure, a scary portion of the media content item, so that the viewer is unable to view any further scary portion of the media content item. In some examples, a user profile may be set up by a user to indicate the type of content that they prefer to view. Additionally or alternatively, the type of media content that a user likes to view may be determined from historical data, such as the user's viewing history and/or search history.

The actions or descriptions of FIG. 6 may be used with any other example of this disclosure, e.g., the example described below in relation to FIGS. 7-9. In addition, the actions and descriptions described in relation to FIG. 6 may be done in any suitable alternative orders or in parallel to further the purposes of this disclosure.

Figure 7B:
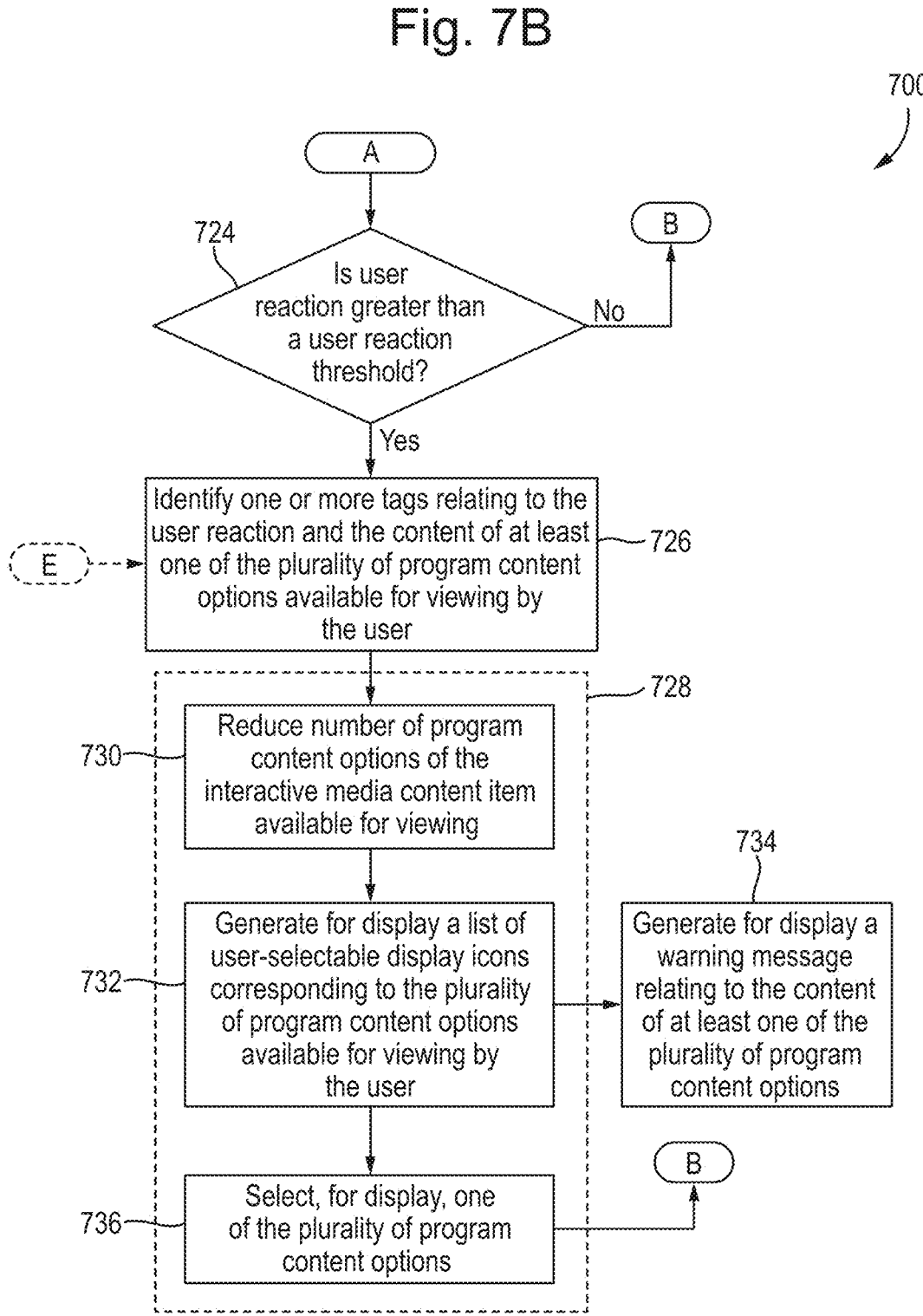
FIG. 7B is a continuation of the flowchart shown in FIG. 7A representing process for process for modifying the content of an interactive media content item, in accordance with some examples of the disclosure.

FIGS. 7A and 7B show a flowchart representing an illustrative process 700 for modifying the content of an interactive media content item. While the example shown in FIGS. 7A and 7B refer to the use of system 100, as shown in FIG. 1, it will be appreciated that the illustrative process shown in FIGS. 7A and 7B may be implemented on system 100, system 200 and system 500, either alone or in any combination, and/or on any other appropriately configured system architecture.

At step 702, control circuitry receives a request to initiate a media guidance application on user device 102. For example, a user may turn on user device 102 or open an OTT application on user device 102 to initiate a media guidance application.

At step 704, control circuitry, in response to initiating the media guidance application, accesses an emotional profile of a user. For example, control circuitry may be configured to determine the identity of the user who initiated the media guidance application, and access an emotional profile of that user. Control circuitry may determine the user's identity in any appropriate manner. For example, control circuitry may determine a user profile that was selected when initiating the media guidance application. Additionally or alternatively, control circuitry may cause a camera, e.g., camera 116 of user device 102 or a camera of a mobile device 118, to capture an image of the environment surrounding the user device 102, and process the captured image using one or more image processing techniques to determine the identity of the user who initiated the media guidance application.

In the context of the present disclosure, an emotional profile of a user contains data regarding one or more psychological states of a user. For example, a user's emotional profile may contain data that associates one or more psychological states (e.g., moods) of a user with different types, e.g., genres, of media content. For example, data in a user's emotional profile may associate excitement with horror movies, or happiness with romantic movies. Additionally or alternatively, a user's emotional profile may contain physiological data corresponding to a plurality of previously watched media content items. For example, the user's emotional profile may contain data that associates an increased heart rate with a particular genre of movie, e.g., a horror movie. Additionally or alternatively, a user's emotional profile may contain user reaction data relating to a plurality of previously watched media content items. For example, the user's emotional profile may contain data that associates a particular user reaction, e.g., laughter, with a particular genre of movie, e.g., a romantic comedy. The user's emotional profile may be constructed over a certain period, e.g., weeks, months, or years, enabling one or more emotional signatures of the user to be determined. For example, an emotional signature may comprise a combination of physiological data and user reaction data indicating a user's mood and/or how a user responds to a particular type of media content. For example, a first emotional signature indicating a slow user heart rate and a user disregarding media content (, e.g., boredom) may be associated with nature documentaries, whereas a second emotional signature indicating an increased heart rate and a fixed gaze on a user device (e.g., interest) may be associated with action movies. In some examples, physiological data and/or user reaction data for a user may be reported, e.g., periodically, to a service provider to refine the user's emotional profile, e.g., a version of the user's emotional profile stored, or at least accessible by, the service provider. Additionally or alternatively, a facial feature emotion recognition system and/or gesture recognition system can capture, e.g., periodically, and analyze images/videos of the user and use the output data as verification and/or additional data for a machine learning algorithm to use for learning a user's emotional profile.

At step 706, control circuitry determines a current emotional state of the user. For example, control circuitry may access historic physiological data of the user, e.g., physiological data measured using wearable device 120 over a predetermined period, e.g., 1 hour, preceding the request to initiate the media guidance application at step 702. The historic physiological data may be used to indicate a current emotional state (e.g., mood) of the user. For example, where the user's heart rate and/or blood pressure has been elevated for an extended period, control circuitry may determine that the user is stressed. Alternatively, where the user's general activity level has been low, e.g., low heart rate and low mobility, control circuitry may determine that the user is bored.

At step 708, control circuitry determines whether the user's current emotional state correspond to data in the user's emotional profile. For example, control circuitry may compare recently recorded user physiological data with physiological data stored in the user profile. In some examples, control circuitry may be configured to provide one or more recommendations for media content based on mapping the user's current emotional state onto the emotional profile of the user. For example, where it has been determined that the user has been stressed for a certain period preceding the initiation of the media guidance application, control circuitry may provide one or more recommendations for relaxing content, e.g., by excluding recommendations for scary or thrilling content. In some cases, control circuitry may determine that the user has recently been bored, and, as such, may recommend exhilarating content. For the sake of clarity, the type of media content that a user might find relaxing or exhilarating may be determined from the user's emotional profile. For example, a first user might find a certain type/genre of content relaxing, while a second user might have a different response to the same type/genre of content. As such, the present disclosure is beneficial as recommendations for media content may be provided based on i) how the user is currently feeling (e.g., determined at step 706) and ii) how the user responds to various types of media content (e.g., determined at step 704), which results in any recommendations provided to the user being more suited to their current state of mind.

Following step 708, when it is determined that there is no, or little, correlation between the emotional profile of the user and the user's current emotional state, process 700 moves to step 710, where default interactive content is provided for user selection. Process 700 may move to step 710 where a user is a new user and/or where a user's emotional profile does not contain enough data to indicate how the user responds to various types of media content.

Following step 708, when it is determined that the user's current emotional state correlates to data in the user's emotional profile, process 700 moves to step 712, where one or more recommended interactive media content items is provided for user selection.

At step 714, a user, e.g., user 110, selects an interactive media content item for display on user device 102.

At step 716, the interactive media content item is displayed on user device 102. In response to the media content item being displayed on user device 102, process 700 may optionally move to process 800 as shown in FIG. 8, which illustrates a process for modifying the content of the interactive media content item based on determining that a plurality of users are viewing the interactive media content item. Arrow C from step 716 indicates moving to step 802 of process 800, where control circuitry determines whether a plurality of users are viewing the interactive media content item, e.g., on user device 102. When it is determined that only a single user, e.g., user 110, is viewing the interactive media content item, step 802 of process 800 moves back to step 716 of process 700 (see arrow D). When it is determined that multiple users, e.g., user 110 and user 112, are viewing the interactive media content item, step 802 moves to step 804, which is discussed below in more detail. For the avoidance of doubt, any of the steps involved in process 800 may be carried out as part of, or in parallel to the steps of process 700, where technically possible.

Returning to process 700, at step 718, control circuitry measures/monitors physiological data of each user viewing the media content item, e.g., in a similar manner to that discussed in step 604 of process 600. For example, physiological data of user 110 may be measured/monitored using wearable device 120, and/or any other suitable measurement/monitoring device. In some examples, one or more physiological characteristics of user 110 may be measured/monitored, e.g., heart rate, blood pressure, skin conductance, etc., and compared to respective physiological characteristic thresholds (e.g., upper or lower) values, e.g., to help determine the user's reaction to the interactive media content item. For example, control circuitry may compare a measured heart rate to a heart rate threshold value, which may be set/input for each user viewing the interactive media content item. For example, control circuitry may access and retrieve a heart rate threshold value from an application installed on a user's mobile device 118 and/or wearable device 120. When it is determined that one or more physiological characteristics of the user are less than respective thresholds, process 700 moves back to step 716. When it is determined that one or more physiological characteristics of the user are greater than respective thresholds, process 700 moves to step 720.

At step 720, control circuitry activates a facial feature emotion recognition system and/or a gesture recognition system to help determine a user reaction to one or more portions of the interactive media content item, e.g., in a similar manner to that described above in relation to step 604 of process 600.

At step 722, control circuitry determines a user reaction based on an output from the facial feature emotion recognition system and/or the gesture recognition system. For example, the facial feature emotion recognition system and/or the gesture recognition system may have been activated in response to the user's heart rate being greater than a threshold value. However, an increase in the user's heart rate may be attributed to various reactions, such as laughter, fear, excitement, etc. As such, the facial feature emotion recognition system and/or the gesture recognition system is activated to help determine the cause of the increase in the user's physiological characteristic(s). For example, the facial feature emotion recognition system and/or the gesture recognition system may compare one or more captured images of the user to an image database to determine the meaning of the user's facial feature emotion, e.g., a smile, wide eyes, or hands over eyes. In this manner, a user reaction is determined based on analysis carried out by the facial feature emotion recognition system and/or the gesture recognition system, triggered by a change in one or more physiological characteristics of the user. Determination of a user reaction in this manner is beneficial for multiple reasons. Firstly, operational efforts by the control circuitry maybe reduced, since the facial feature emotion recognition system and/or the gesture recognition system is activated in response to a determined changed in a physiological characteristic. Secondly, determination of the user reaction is more accurate, since a determined changed in a physiological characteristic is then checked against a physical reaction, e.g., facial/body movement reaction.

At step 724, control circuitry determines whether the user reaction is greater than a user reaction threshold. For example, a first user, e.g., user 110, may set a threshold reaction level, e.g., in relation to a level of fear, at a different level to another user, who might set a greater or lower threshold level. In some examples, control circuitry may determine the intensity of the user reaction, e.g., based on the amount by which the user's physiological characteristic(s) are above respective physiological characteristic threshold values. Additionally or alternatively, the intensity of the user reaction may be based on the speed and/or or duration of the user's physical reaction, e.g., the speed at which a user covers their face or averts their gaze from user display 102, or the period for which a user laughs, cries, etc. Setting or determining a user specific reaction threshold is beneficial as it allows for user-specific modification of the interactive media content item. When it is determined that the user reaction is less than a user reaction threshold, process 700 moves back to step 716. When it is determined that the user reaction is greater than the user reaction threshold, process 700 moves to step 726, e.g., to account for the possibility that the user might be uncomfortable in continuing to view a current plot option of the interactive media content item. In the example shown in FIG. 1, the interactive media content item being displayed on the user device 102 has a scary scene (illustrated by ghost 122). In such an example, control circuitry may determine that the reaction of user 110 to the scary scene is greater than a user reaction threshold, e.g., based on the user's heart rate, skin conductivity and a physical body movement in reaction to the scene. Such a reaction indicates that it would be preferable to modify the content of the interactive media content item. In some examples, control circuitry generates for display an icon, e.g., flag 130, indicating that the user reaction threshold, e.g., for user 110, has been exceeded. Flag 130 may be generated for display at a location on transport bar 132 corresponding to the portion of the interactive media content item that caused the user reaction to exceed the user reaction threshold. In some examples, flag 130 may be user-selectable to enable the user to pause the display of the interactive media content item, e.g., in direct response to the user reaction exceeding the user reaction threshold, such that user 110 can request modification of the interactive media content item as soon as possible.

Figure 10A:
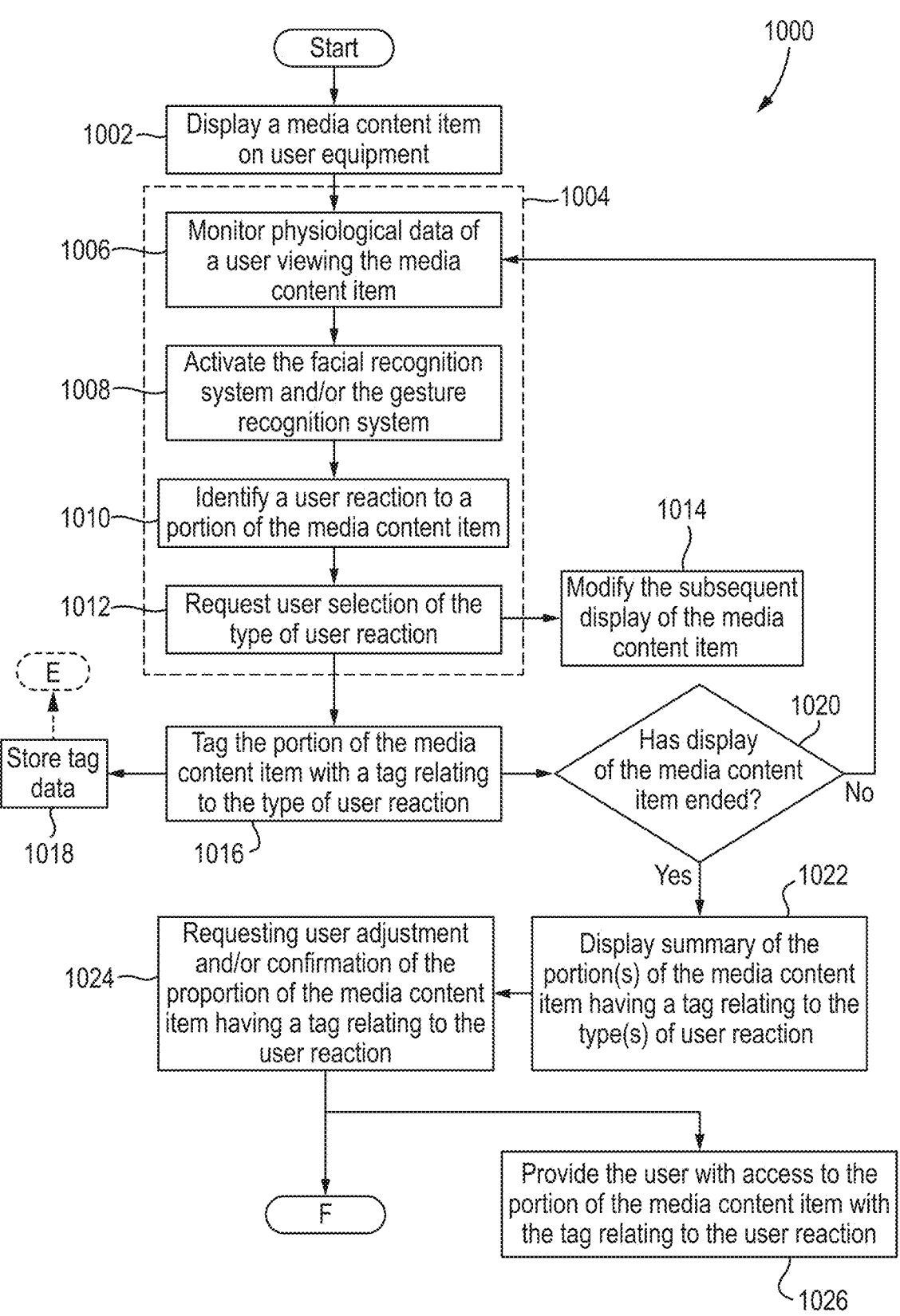
FIG. 10A is a flowchart representing process for process for generating an interactive review relating to a user reaction to a media content item, in accordance with some examples of the disclosure.
Figure 10B:
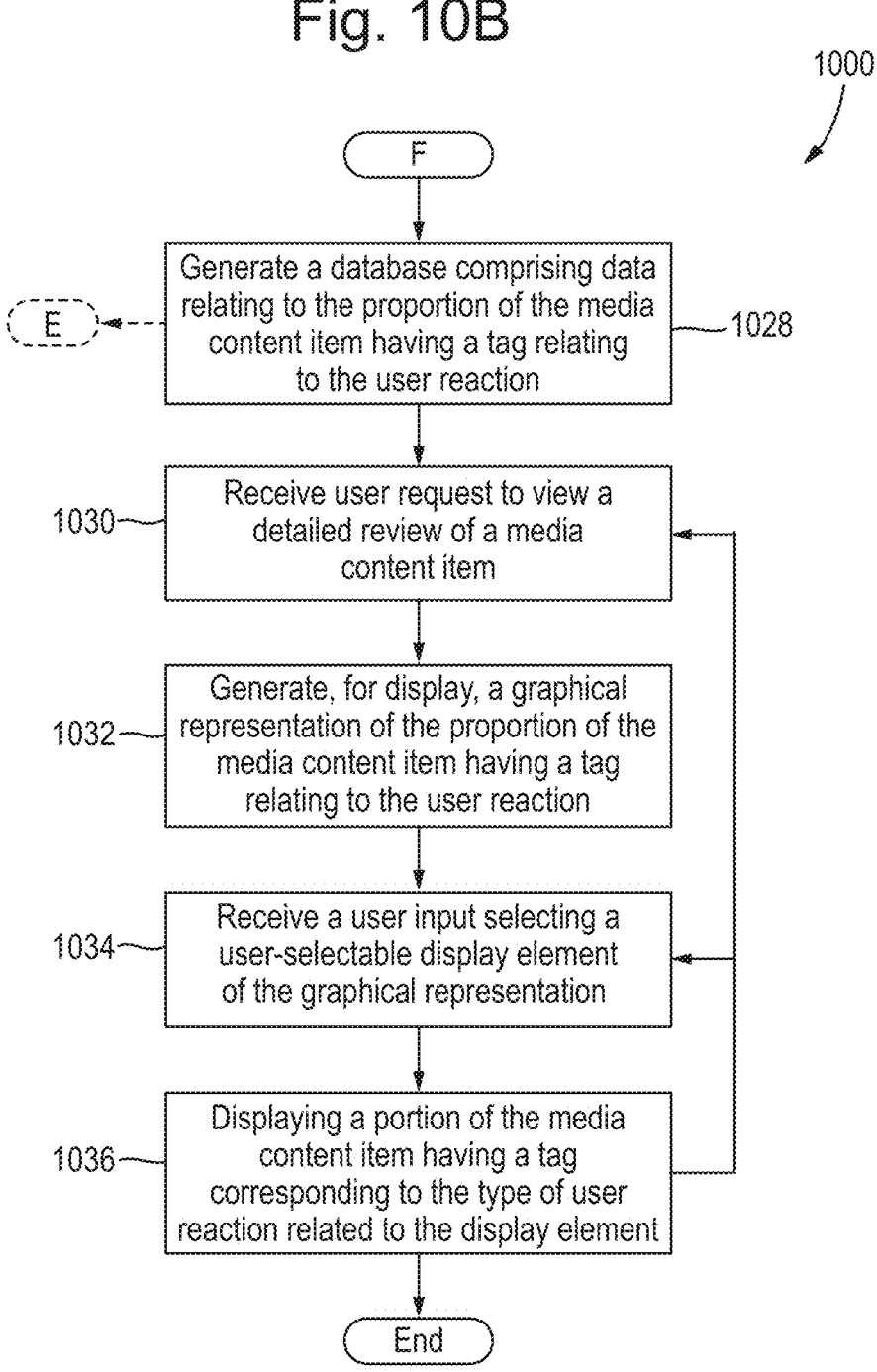
FIG. 10B is a continuation of the flowchart shown in FIG. 10A representing process for process for generating an interactive review relating to a user reaction to a media content item, in accordance with some examples of the disclosure.

At step 726, control circuitry identifies one or more tags relating to the user reaction and the interactive media content item, e.g., one or more tags relating to the content of at least one of a plurality of program content options (e.g., plots/storylines) of the interactive media content item available for selection and viewing by the user. For example, control circuitry may access a database having metadata relating to one or more scenes or frames of the interactive media content item, indicating the content of the scene/ frame. For example, a scene may be tagged by a content provider and/or another user as containing a particular type and/or severity of content. In some examples, different program content options of the interactive media content item available for selection and viewing by the user may have similar scenes that are adapted to be less or more scary than an original version. For example, a first program content option of the interactive media content item may comprise a less scary scene compared to a second program content option having a scarier scene. In some examples, a tag relating to the content of program content options of the interactive media content item may be generated by one or more other users who have previously viewed the media content item. Process 1000 as shown in FIGS. 10A and 10B below illustrate a process for such tag generation and storage. Arrow E at step 726 indicates how the methodology of process 1000 may be optionally implemented in process 700. In some examples, the tags for the frame/scenes (e.g., extremely scary, etc.) may be determined from reviews, e.g., based on comments/content from a website (e.g., IMDB, Rotten Tomatoes, etc.) for reviewing media content items.

At step 728, control circuitry modifies the content of the interactive media content item based on the user reaction to one or more portions of the interactive media content item and a tag of one or more of the selectable program options of the interactive media content item. For example, the content of the interactive media content item may be modified based on determining that the user is scared and a tag indicating that one of the selectable program options contains extreme scary content. In some examples, control circuitry may search a database of tags of relating to the selectable program options for tags corresponding, at least in part, to the user reaction. In some examples, a value, e.g., a numerical score, associated with the user's emotional state may be determined, e.g., using a combination of physiological data (e.g., determined at step 718) and user reaction data (e.g., determined at step 722) indicating the user's mood and/or how the user responded to the type of content displayed to the user as part of the interactive media content. In other words, the user's emotional signature, or change in emotional signature, may be determined as the user is viewing the interactive media content item. At least one of the value associated with the user's emotional state, physiological data of the user, user reaction data and/or the user's emotional signature may be shared with user device 102 and/or communicated to server 504 (e.g., a server of a service provider who is providing the interactive media content item) in order to assist with the selection of one or more program content options to transmit to user device 102 and/or present to user 110 for continuing the viewing of the interactive media content item. For example, while watching the interactive media content item, a service provider may offer a "mood-service" that determines which plot(s) user 110 is able to select from and deliver them to user device 102. In one example, a dedicated playlist and/or manifest is transmitted to the user device 102 (client) and the user device 102 utilizes such playlist and/or manifest when it is determined that the content of the interactive media content item should be modified based on the user mood, e.g., based on the user's emotional signature determined in response to a viewed portion of the interactive media content item. For example, the playlist and/or manifest may indicate which program content options (e.g., segments of the interactive media content item) to request/fetch based on the reported value of the user's emotional state. Similarly, the emotional state can be reported to server 504, which in turn presents a playlist and/or manifest of program content option(s), e.g., to user device 102. The user device 102 can then make the appropriate requests for the program content option(s) associated with the plot that was chosen from the playlist and/or manifest. Additionally or alternatively, the possible/suitable program content options may be part of a separate playlist and/or manifest and may be pre-associated with an emotional state of the user, which is used to fetch the corresponding program content options, e.g., based on data in the user's emotional profile and a current emotional state of the user, just prior to viewing the interactive media content item.

In the example shown in FIGS. 7A and 7B, the modification of the interactive media content item comprises steps 730, 732 and 736.

At step 730, control circuitry reduces the number of program content options of the interactive media content item available for viewing by the user. For example, in response to determining that a user is scared, control circuitry may remove one or more program content options containing extreme scary content, since it is unlikely that the user would be interested in viewing extreme content. In a similar manner, in response to determining that a user is laughing, control circuitry may remove one or more program content options containing serious content, since unlikely that the user would be interested in changing the type of material being viewed.

At step 732, control circuitry generates for display a list 124 of available selectable program content options. For example, the list 124 may comprise multiple user-selectable display icons 126 corresponding to the plurality of program content options available for viewing by the user. In the example shown in FIG. 1, the list comprises three program content options (e.g., versions A, B and C of the interactive media content item) that the user may wish to select to continue viewing the interactive media content item.

At step 734, control circuitry generates for display to the user a warning message relating to the content of at least one of the selectable program content options. For example, control circuitry may generate the list of available selectable program content options, and provide a warning relating to one or more of the selectable program content options. In the example shown in FIG. 1, list 124 has been generated displaying multiple user-selectable display icons 126 relating to program content options available to the user for continuing with the viewing of the interactive media content item. A warning message, e.g., warning display element 128, is generated for version C since one or more tags for version C indicate that it contains extreme scary content. In some examples, tags relating to the type of content and/or the severity of a content type may be generated by one or more other viewers who have previously watched the program content options, e.g., version C. Such a warning is beneficial when it has been determined that a user reaction relating to fear is greater than a user fear threshold. In some examples, assignment of a warning message or messages may depend on the user reaction threshold, and/or the level by which a user reaction is greater than the user reaction threshold. For example, where the user reaction is only just greater than the user reaction threshold, a warning message may be generated on a version or versions having extreme content, whereas where the user reaction is much greater than the user reaction threshold, a warning message may be generated on a version or versions having at least content of the same or similar levels of extremity.

At step 736, control circuitry receives a selection, e.g., by user 110, of one of the selectable program content options 126 in list 124. In this manner, a user is able to control the type of content displayed as part of the interactive media content item, such that a chosen program content option, e.g., version B, is aligned with the user's current mood and level/type of reaction to the interactive media content. In some examples, step 728 is carried out in direct response to a user reaction breaching a user reaction threshold, e.g., as soon as possible after the user reaction exceeds the user reaction threshold. In some examples, selection of one of the available program content options is automatic. For example, when the user reaction has exceeded the user reaction threshold by a large amount, e.g., where the content of the media content item has caused an extreme user reaction, e.g., very scared, control circuitry may automatically select, or at least highlight, a program content option having less scary content. Following selection of a program content option, process 700 moves back to step 716 to display the interactive media content item, e.g., until it is finished, or the user stops playback.

The actions or descriptions of FIGS. 7A and 7B may be used with any other example of this disclosure. In addition, the actions and descriptions described in relation to FIGS. 7A and 7B may be done in any suitable alternative orders or in parallel to further the purposes of this disclosure.

Figure 8:
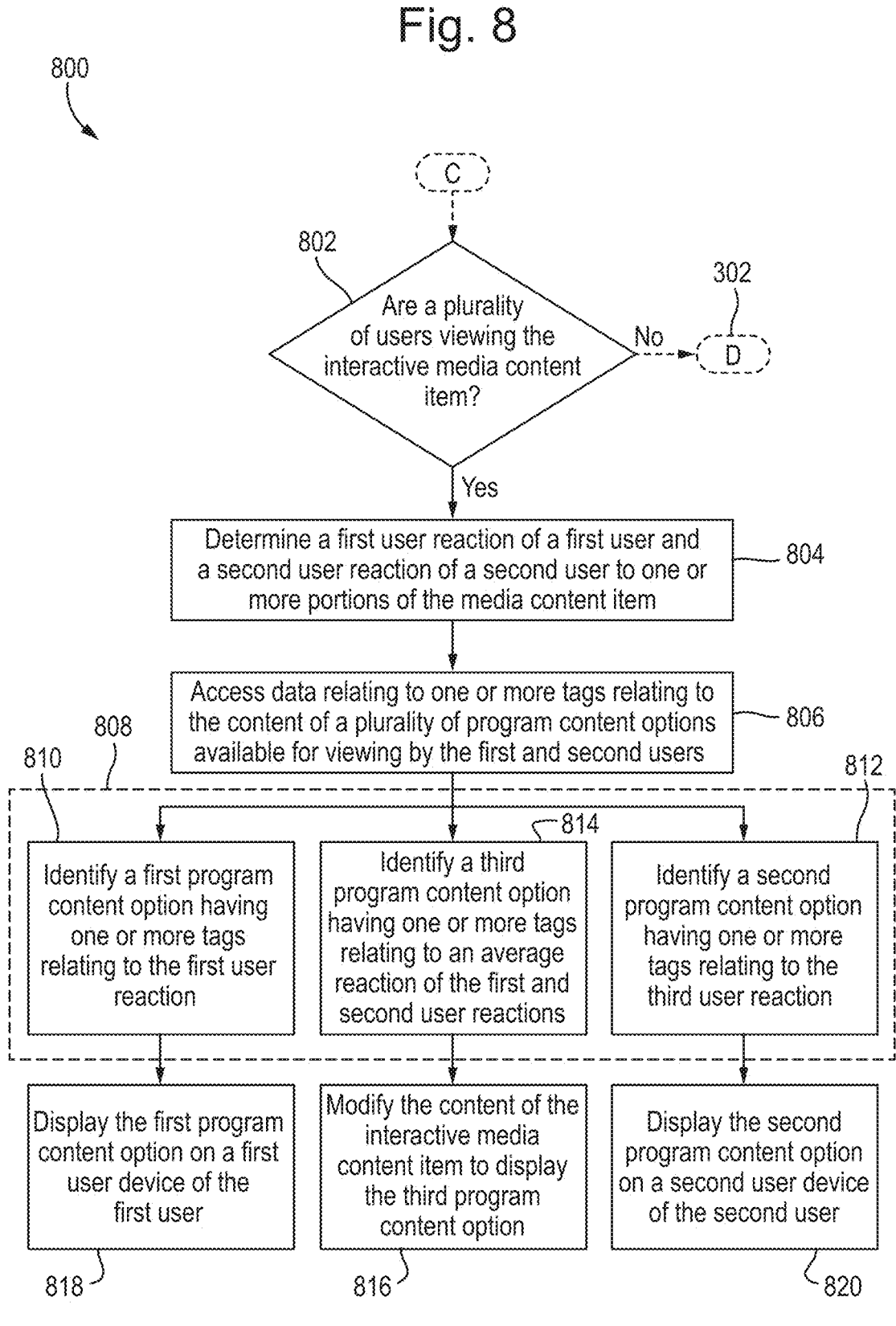
FIG. 8 is a flowchart representing process for process for determining if a plurality users are viewing a media content item and modifying the content of the interactive media content item accordingly, in accordance with some examples of the disclosure.

FIG. 8 shows a flowchart representing an illustrative process 800 for modifying the content of an interactive media content item being viewed by multiple users. While the example shown in FIG. 8 refers to the use of system 100, as shown in FIG. 1, it will be appreciated that the illustrative process shown in FIG. 8 may be implemented on system 100, system 200 and system 500, either alone or in any combination, and/or on any other appropriately configured system architecture. Further, is it understand that the steps outlined in FIG. 8 may be incorporated, where technically possible, with the steps outlined in process 700 shown in FIGS. 7A and 7B.

At step 802, control circuitry determines whether there are multiple users viewing the interactive media content item. In some examples, step 802 follows on from step 716 shown in FIG. 7A (see arrow C). When control circuitry determines that there is only a single user viewing the interactive media content item, step 802 returns back to step 716 shown in FIG. 7A (see arrow D). When control circuitry determines that multiple users, e.g., user 110 and user 112, are viewing the interactive media content item, process 800 moves to step 804.

At step 804, control circuitry determines a first user reaction of a first user, e.g., user 110, and a second user reaction of a second user, e.g., user 112, to one or more portions of the interactive media content item. The reaction of each user may be determined in a similar manner to that described for step 604 of process 600 and steps 718 to 724 of process 700. In the example shown in FIG. 1, each user 110, 112 is wearing a wearable device 120 configured to communicate with respective mobile devices 118. The wearable devices 120 are each configured to measure/monitor one or more physiological characteristics of respective users 110, 112. Camera 116 of user device 102 is configured to capture images of the users 110, 112. In some examples, control circuitry may cause data relating to one or more physiological characteristics of respective users 110, 112 and the captured images to be transmitted to server 108 for analysis. In the example shown in FIG. 1, control circuitry has determined that the user 110 and user 112 have had different reactions to the interactive media content item. For example, user 110 has reacted in a scared manner, indicated by flag 130, and user 112 has reacted with enjoyment, indicated by flag 134.

At step 806, control circuitry identifies one or more tags relating to the content of a plurality of program content options of the interactive media content item available for viewing by the first and second users. For example, control circuitry may access a database to determine one or more tags describing the content and/or severity of the content of the program content options of the interactive media content item. In this manner, control circuitry is able to determine which of the available content options correspond to, or is appropriate for, one or more user reactions.

At step 808, control circuitry identifies a first program content option having one or more tags corresponding to the first user reaction. For example, at step 810 control circuitry identifies a first program content option having a tag indicating that its content is less scary than the content of the media content item already displayed. Thus, the first program content option may be appropriate for the first user, since the control circuitry has determined that the first user 110 is scared. In a similar manner, at step 812 control circuitry identifies a second program content option having a tag indicating that its content is scarier than the content of the media content item already displayed. Thus, the second program content option may be appropriate for the second user 112, since the control circuitry has determined that the second user 112 is enjoying the scary content of the media content item. In some example, at step 814 control circuitry identifies a third program content option having a tag indicating that its content is as scary as, or similar to, the content of the media content item already displayed. Thus, the third program content option may be most suitable to display to the first user 110 and the second user 112, e.g., as default content having one or more tags indicating that the type/severity of the content of the third program content option falls between that of the first program content option and the second program content option.

At step 816, control circuitry modifies the content of the interactive media content item by selecting the third program content option (e.g., version B) for display on the user device 102, since neither of the first and second program content options are suitable for display to both of the first and second users 110, 112.

At step 818, control circuitry causes the first program content option (e.g., version A) to be displayed on the mobile device 118 of the first user 110, so that the first user 110 can choose to watch a version of the media content item that is more suitable for their reaction to the preceding content of the media content item, should they wish. Additionally or alternatively, the first program content option (e.g., version A) may be sent to storage accessible by user equipment of the first user 110. For example, control circuitry may cause the first program content option to be stored on tablet or laptop of the first user 110, so that they can view the less scary version of the interactive media content item at a later time, should they wish.

At step 820, control circuitry causes the second program content option (e.g., version C) to be displayed on the mobile device 118 of the second user 112, so that the second user 112 can choose to watch a version of the media content item that is more suitable for their reaction to the preceding content of the media content item, should they wish. Additionally or alternatively, the second program content option (e.g., version C) may be sent to storage accessible by user equipment of the second user 112. For example, control circuitry may cause the second program content option to be stored on tablet or laptop of the second user 112, so that they can view the scarier version of the interactive media content item at a later time, should they wish.

The actions or descriptions of FIG. 8 may be used with any other example of this disclosure. In addition, the actions and descriptions described in relation to FIG. 8 may be done in any suitable alternative orders or in parallel to further the purposes of this disclosure.

Figure 4A:
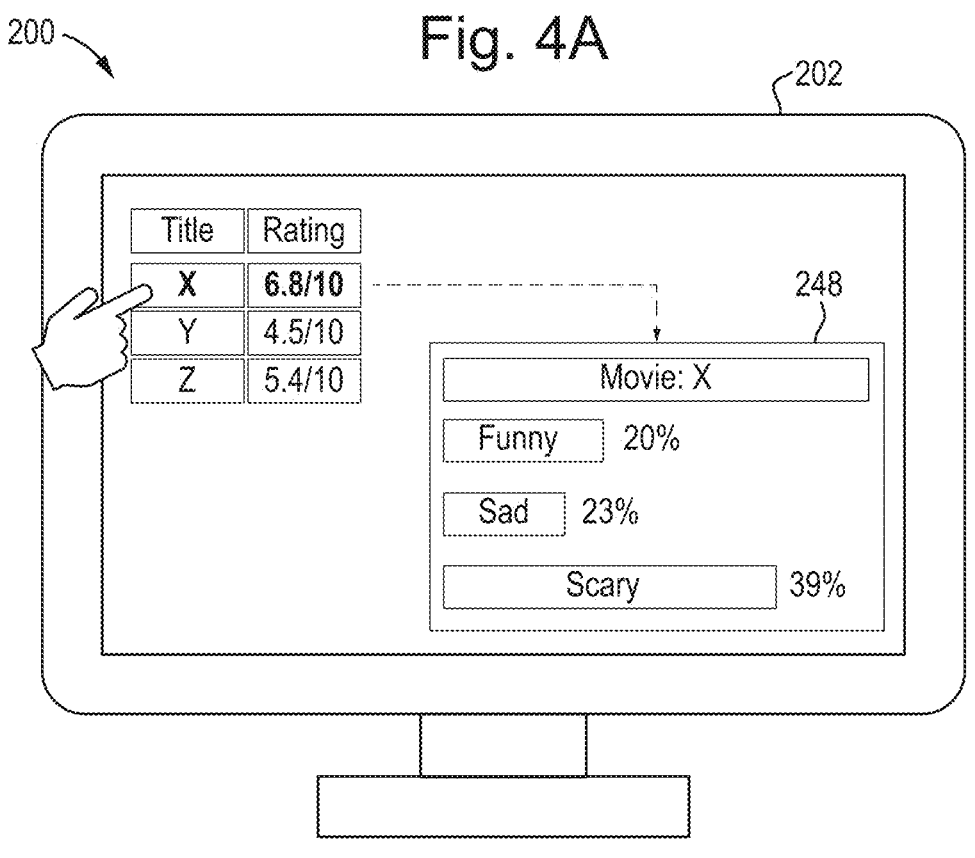
FIG. 4A illustrates a display screen that may be used to provide an interactive review of a media content item, in accordance with some examples of the disclosure.
Figure 4B:
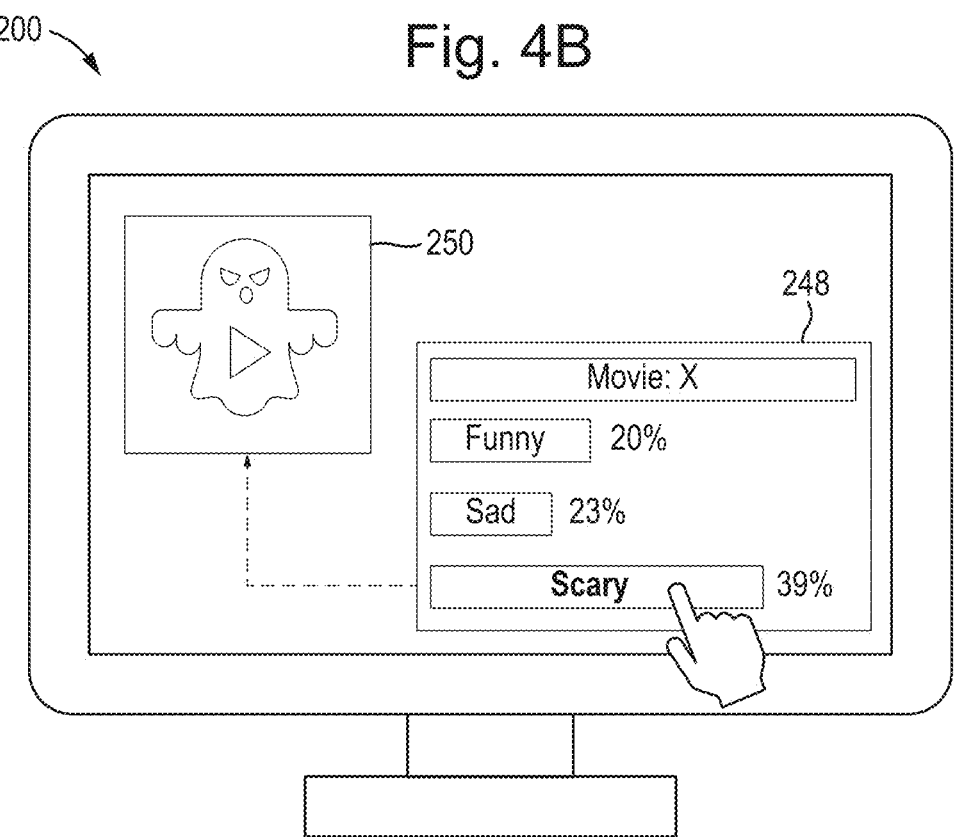
FIG. 4B illustrates the display screen that may be used to provide an interactive review of a media content item, in accordance with some examples of the disclosure.

FIG. 9 shows a flowchart representing an illustrative process 900 for storing data relating to a user reaction to a media content item. The actions or descriptions of FIG. 9 may be used with any other example of this disclosure. In addition, the actions and descriptions described in relation to FIG. 8 may be done in any suitable alternative orders or in parallel to further the purposes of this disclosure. While the example shown in FIG. 9 refers to the use of system 200, as shown in FIGS. 3, 4A and 4B, it will be appreciated that the illustrative process shown in FIG. 9 may be implemented on system 100, system 200 and system 500, either alone or in any combination, and/or on any other appropriately config-ured system architecture. Further, is it understand that the steps outlined in FIG. 9 may be incorporated, where tech-nically possible, with the steps outlined in process 600 shown in FIG. 6 and/or process 700 shown in FIGS. 7A AND 7B.

At step 902, control circuitry causes a media content item to be displayed on a user device 202, e.g., in a similar manner to that described for step 602 of process 600 and/or step 716 of process 700. For example, control circuitry may be configured to allow a user 210 to select and view the media content item using a content guidance application. In the example shown in FIG. 2, user 110 has chosen to view a movie comprising a scary scene, which is currently being displayed on user device 202. However, the first media content item may comprise any type of audio and/or visual media content. For example, the media content item may be a transmission of a live event, such as a football game, or an audio recording of a concert. In particular, the media content item may be an interactive media content item, e.g., a media content item having selectable programming options that define the plot of the media content item. In some examples, step 902 may be preceded by steps similar to those described in steps 702 to 714 of process 700. Additionally, one or more other users 212 may have selected the same media content item to view on respective user devices 202, either concur-rently or at different times.

At step 904, control circuitry determines one or more user reactions, e.g., of multiple users, to one or more portions of the media content item, e.g., in a similar manner to that described for step 604 of process 600 and/or steps 718 to 722 of process 700. For example, one or more physiological characteristics of user 210 may be measured/monitored using wearable device 220, and mobile device 218 and/or camera 216 may be configured to capture one or more images/videos of user 210, to which one or more image processing techniques may be applied, as described above. Additionally or alternatively, one or more physiological characteristics of at least one of users 212 may be measured/monitored using respective wearable device(s) (not shown), and respective mobile device(s) 218 and/or any appropriate camera, e.g., camera(s) 216, may be configured to capture one or more images/videos of user(s) 212, to which one or more image processing techniques may be applied, as described above.

At step 906, control circuitry tags the one or more portions of the media content item with a tag corresponding to the user reaction. For example, control circuitry may determine that the user had a first type of user reaction, e.g., laughter, to a first portion of the media content item (see flag 230 on transport bar 232), a second type of user reaction, e.g., sadness, to a second portion of the media content item (see flag 234 on transport bar 232), and a third type of user reaction, e.g., fear, to a third portion of the media content item (see flag 236 on transport bar 232). In some examples, control circuitry is configured to allow user 210 to tag one or more portions of the media content item with a tag corresponding to a user reaction, e.g., using one or more flags (or other markers) on transport bar 232. Such flags may be user-selectable to allow user 210 (and/or one or more other users 212) to jump to the specific portions of the media content item having a tag corresponding to a particular type of user reaction, e.g., scary, thrilling, funny, etc. In some examples, the user device 202 can display a graph (e.g., a line graph) where the peaks/troughs of the graph are asso-ciated with the scenes that are most notable. For example, scenes may be characterized as notable by having a number of tags relating to a type of content a over a predetermined number, where such tags have been generated based on physiological data and/or one or more user reactions col-lected from a large sample of viewers, and/or generated directly by a user indicating that a scene comprises a certain type of content.

At step 908, control circuitry determines a proportion of the media content item having a tag corresponding to the user reaction(s). For example, control circuitry may deter-mine the proportion of the media content item having tags corresponding to each type of user reaction. In some examples, control circuitry may determine the duration of portion of the media content item the caused the user to have a type of user reaction. For example, control circuitry may determine, e.g., using metadata for the media content item, physiological data of the user and/or analysis of one or more images captured while the user is viewing a portion of the media content item corresponding to the user reaction, the amount of time for which a user reacted in a particular manner. In the example shown in FIG. 2, control circuitry may determine the duration of each of the portions of the media content item the resulted in tags relating to each of the first, second and third types of user reactions to be generated. For example, user 210 may have laughed for 90 seconds as part of the first user reaction, may have been sad for 20 second as part of the second user reaction, and may have been scared for 120 seconds as part of the third user reaction. Additionally or alternatively, control circuitry may deter-mine the duration of the scenes in the media content item that lead to user 210 having each of the first, second and third types of user reactions. For example, the scene in which user 210 had the first user reaction may have been 5 minutes in duration, the scene in which user 210 had the second user reaction may have been 7 minutes in duration, and the scene in which user 210 had the third user reaction may have been 10 minutes in duration. In this manner, control circuitry can determine the proportion of the total duration of the media content item that corresponds to each type of user reaction.

At step 910, control circuitry causes storage of data relating to the proportion of the media content item having a tag corresponding to the user reaction, e.g., to each type of user reaction. In some examples, such data can be accessed by one or more users and/or a dedicated review website to provide a detailed analysis of the type of content contained in the media content item. Access to such data is beneficial, as it provides insight into how users reacted to the media content item, rather than simply having a review score (e.g., 6.8/10, or 3/5 stars) and/or a synopsis of the media content item on which to base their viewing choice.

The actions or descriptions of FIG. 9 may be used with any other example of this disclosure. In addition, the actions and descriptions described in relation to FIG. 9 may be done in any suitable alternative orders or in parallel to further the purposes of this disclosure.

FIGS. 10A and 10B show a flowchart representing an illustrative process 1000 for generating a review of a content of a media content item based on a user reaction. While the example shown in FIGS. 10A and 10B refers to the use of system 200, as shown in FIGS. 2, 3, 4A and 4B, it will be appreciated that the illustrative process shown in FIGS. 10A and 10B may be implemented on system 100, system 200 and system 500, either alone or in any combination, and/or on any other appropriately configured system architecture. Further, is it understand that the steps outlined in FIGS. 10A and 10B may be incorporated, where technically possible, with the steps outlined in process 600 shown in FIG. 6 and/or process 700 shown in FIGS. 7A and 7B.

At step 1002, control circuitry display a media content item on user equipment. Step 1002 may be carried out in a similar manner to that described for step 602 of process 600, step 716 of process 700, and/or step 902 of process 900.

At step 1004, control circuitry determines a user reaction to one or more portions of the media content item. In the example shown in FIGS. 10A and 10B, step 1004 comprises steps 1006, 1008, 1010 and 1012.

At step 1006, control circuitry measures/monitors physiological data of a user viewing the media content item. Step 1004 may be carried out in a similar manner to that described for step 604 of process 600, step 718 of process 700, and/or step 904 of process 900.

At step 1008, control circuitry activates a facial recognition system and/or a gesture recognition system. Step 1008 may be carried out in a similar manner to that described for step 604 of process 600, step 720 of process 700, and/or step 904 of process 900.

At step 1010, control circuitry identifies a user reaction to a portion of the media content item. For example, control circuitry may be configured to analyse data resultant from steps 1006 and 1008 to determine that the user has had a reaction to a portion of the media content item. However, in some cases, it may be difficult to determine the type of user reaction, e.g., where the user is a new user, or where data resultant from steps 1006 and 1008 leads to an ambiguous conclusion as to the type of user reaction. For example, when the user exhibits an increased heart rate and covers their face, it may indicate that the user is afraid, shocked or upset, etc. Moreover, each individual may exhibit a different behavioral pattern for a given reaction type. In such cases, it is beneficial to seek user input to help clarify the issue, e.g., so that system 200 can learn one or more behavioral patterns relating to a reaction of a user to a particular type of content.

At step 1012, control circuitry requests user selection (e.g., confirmation) of the type of user reaction. In the example shown in FIG. 2, control circuitry generates for display a list 238 of possible user reactions that correspond to the identified reaction. The list 238 comprises multiple user-selection elements 240, each relating to a different type of user reaction. In some examples, the list 238 of possible user reactions may be generated in response to a flag relating to the location of a user reaction in the media content item. For example, control circuitry may identify that a user has reacted, may add a flag to transport bar 232, and request user selection/confirmation of the type of user reaction. In the example shown in FIGS. 10A and 10B, the user 210 selects scared as the reaction that corresponds to their feeling/mood. Upon user selection of the most suitable type of user reaction, control circuitry may add an appropriate image/icon to the flag, such as those shown in flags 230, 234 and 236.

At step 1014, in response to determining the type of user reaction, control circuitry modifies the subsequent display of the media content item. Modification of the content of the media content item may be carried out in a manner similar to that described for step 606 of process 600, step 728 of process 700, and/or step 816 of process 800.

At step 1016, control circuitry tags a portion of the media content item with a tag corresponding to the user reaction. Tagging of the media content item may be carried out in a manner similar to that described for step 906 of process 900. For example, control circuitry may be configured to generate a tag by causing metadata relating to the type of content of a portion of the media content item to which the user reacted to be generated, e.g., where control circuitry has determined that the user was scared by a particular portion of the media content item, a tag, such as scary content, may be added to the frame/scene of the media content item to which the user 210 reacted.

At step 1018, control circuitry causes one or more of the generated tags to be stored, e.g., in a database. Storage of the one or more tags may be carried out in a manner similar to that described for step 910 of process 900.

For the avoidance of doubt, steps 1004, 1016 and 1018 may be carried out for the purpose of generating a tag used in step 606 of process 600, step 726 of process 700, and/or step 806 of process 800. This is exemplified by arrow E from step 1018 of process 1000 to step 726 of process 700.

At step 1020, control circuitry determines whether the media content item has ended. When the media content item has not ended, process 1000 returns to step 1006 to continue determining any further user reactions to the remainder of the media content item. When the media content item has ended, process 1000 moves to step 1020.

At step 1022, control circuitry causes user device 202 to display a summary of the portion(s) of the media content item having a tag relating to the type or types of user reaction determined at step 1004. In the example shown in FIG. 3, summary 242 has been generated and is displayed on user device 202. Summary 242 comprises a title indicating the name of the media content item and the user to which the summary relates. Summary 242 has a breakdown of the proportions of the media content item having tags relating to various types of user reactions. The proportion of the media content item having a tag or tags relating to a particular type of user reaction may be determined in a similar manner to that described for step 908 of process 900. The summary 242 shown in FIG. 2 indicates that the user had a 22% funny reaction to the media content item, a 18% sad reaction to the media content item, and a 46% scary reaction to the media content item, e.g., based on the tags generated at step 1016.

At step 1024, control circuitry requests user adjustment and/or confirmation of the proportion of the media content item having a tag relating to each type of user reaction. For example, summary 242 comprises user-selectable up-down arrows 244 for each type of user reaction, so that the user can manually adjust the proportion of the media content item relating to each type of user reaction. This is beneficial as it allows system 200 to learn whether or not the generated tags are accurate. When the user is happy that the proportions of the media content item relating to each type of user reaction accurately reflect their emotional response to the media content item (or when the summary is already accurate), the user is requested to confirm the summary, e.g., using user-selectable confirmation icon 246.

At step 1026, control circuitry provides the user with access to the portion(s) of the media content item having a tag relating to one or more of their reactions. For example, control circuitry may provide the user with access to each of the portions (e.g., scenes) of the media content item corresponding to the locations of flags 230, 234 and 236, as shown on FIG. 2. Providing access to such portions of the media content item may incentivize a user to correct the summary, so that system 200 is able to learn whether the generated tags are accurate.

At step 1028, control circuitry generates a database comprising data relating to the proportion of the media content item having a tag or tags relating to each type of user reaction. Such a database may be used in step 606 of process 600, step 726 of process 700, and/or step 806 of process 800. This is exemplified by arrow E from step 1018 of process 1000 to step 726 of process 700.

At step 1030, control circuitry receives a request from a user, e.g., a different user to user 210 who generated the tags), to view a detailed review of a media content item. For example, FIG. 4 shows a user device, e.g., user device 202 or a user device of another user, displaying several rating scores for media content items X, Y and Z. Conventionally, a user has only the general ratings and written reviews of the media content items on which they can base their viewing choices. For example, media content item X has a rating score of 6.8/10, Y has a rating score of 4.5/10, and Z has a rating score of 5.4/10. The present disclosure is beneficial as it allows a user to access a detailed review of a media content item, e.g., based on the emotional reactions of a plurality of users who have previously viewed the media content item, e.g., users 210 and 212.

At step 1032, control circuitry generates for display, upon user selection of the media content item in which they are interested in seeing more detail, a graphical representation of the proportion of the media content item having a tag or tags relating to various types of user reactions (e.g., of multiple users) to the media content item. For example, upon user-selection of media content item X, control circuitry causes a summary 248 of various users' reactions to media content item X. In the example shown in FIGS. 4A and 4B, the proportions of the media content item relating to funny, sad and scary tags are different to those shown in summary 242 of FIG. 3, since the data used to generate summary 248 is taken from multiple users' reactions, and, as such, may be an average of many users' data. Display of summary 248 is beneficial to a user since the user is able to understand the emotional response of other users to media content item X more clearly. Such an understanding can help the user make a more informed decision regarding their choice to view the media content item.

At step 1034, control circuitry receives a user input selecting a user-selectable display element relating to one of the types of user reaction. In the example shown in FIG. 4B, the user selects the display element relating to scary, since they are interested in knowing further detail regarding what aspects of media content item X other users have found scary. Such understanding allows a user to determine whether they will find the media content item scary, and/or if the scary content of media content item X is appropriate for one or more other users, e.g., children or teenagers.

At step 1036, in response to receiving the user input selecting a user-selectable display element relating to one of the types of user reaction, e.g., the scary display element, control circuitry provides the user with access to the one or more portions of the media content item having a tag relating to scary user reactions. In this manner, the user can review the scary content before deciding to view the media content item. In the example shown in FIG. 4B, control circuitry causes media content item portion 250 to be displayed on user device 202, and/or on any other appropriate user device.

The actions or descriptions of FIGS. 10A and 10B may be used with any other example of this disclosure. In addition, the actions and descriptions described in relation to FIGS. 10A and 10B may be done in any suitable alternative orders or in parallel to further the purposes of this disclosure.

Additional or alternative items:

Item 1. A method for storing data relating to a user reaction to a media content item comprising:
  displaying a media content item on user equipment;
  determining, using control circuitry, a user reaction to one or more portions of the media content item;
  tagging the one or more portions of the media content item with a tag corresponding to the user reaction;
  determining a proportion of the media content item having a tag corresponding to the user reaction;
  storing data relating to the proportion of the media content item having a tag corresponding to the user reaction.

Item 2. The method of item 1, wherein determining the user reaction comprises:
  monitoring one or more facial expressions of the user and/or one or more gestures of the user while viewing the media content item; and/or
  monitoring physiological data of the user while viewing the media content item.

Item 3. The method of item 1, wherein determining the user reaction to one or more portions of the media content item comprises:
  in response to determining a change in the physiological data of the user, activating a facial recognition system and/or a gesture recognition system to determine the first type of user reaction.

Item 4. The method of item 1, wherein determining the user reaction comprises:
  identifying a user reaction to one or more portions of the media content item; and requesting user selection of the type of user reaction.

Item 5. The method of item 1, wherein determining the proportion of the media content item having a tag relating to the user reaction comprises requesting user adjustment of the proportion of the media content item having a tag relating to the user reaction.

Item 6. The method of item 5, the method further comprising:
  in response to receiving user adjustment of the proportion of the media content item having a tag relating to the user reaction, providing the user with access to the portion of the media content item with a tag relating to the user reaction.

Item 7. The method of item 1, the method further comprising:
  generating, based on the stored data, a database comprising data relating to the proportion of the media content item having a tag relating to the user reaction; and
  generating, for display, a graphical representation of the proportion of the media content item having a tag relating to the user reaction based on the database.

Item 8. The method of item 7, wherein the graphical representation comprises one or more user-selectable display elements each relating to a different type of user reaction, the method further comprising:

receiving a user input selecting a user-selectable display element; and in response to receiving the user selection, displaying a portion of the media content item having a tag corresponding to the type user reaction relating to the selected display element.

Item 9. The method of item 1, the method further comprising:

in response to determining the user reaction to one or more portions of the media content item, modifying the subsequent display of the media content item.

Item 10. The method of item 9, wherein modifying the subsequent display of the media content item is based on one or more user reactions of at least one other user that has previously viewed one or more portions of the media content item.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

identifying, using a control circuitry, a first device associated with a first user, a second device associated with a second user, and a shared device displaying a media content item for simultaneous consumption by both the first user and the second user;

identifying, using the control circuitry, a first psychological characteristic of the first user and a second psychological characteristic of the second user;

determining that (a) the first psychological characteristic of the first user does not match the first user's preference for the first psychological characteristic identified in a profile of the first user, and (b) the second psychological characteristic of the second user matches the second user's preference for the second psychological characteristic identified in a profile of the second user;

based at least in part on the determining:

modifying the display of the media content item on the shared device to a version of the media content item selected to match the first user's preference for the first psychological characteristic of the first user; and causing to be transmitted, to the second device associated with the second user, the media content item without modifications.

2. The method of claim 1, wherein identifying the first psychological characteristic of the first user and the second psychological characteristic of the second user, further comprises:

accessing historic data relating to the first users and the second users heart rate measured during previously viewed media content; and comparing a current measurement of the first users and the second users heart rate to the historic data.

3. The method of claim 2, wherein the historic data contains tags relating to how the first user's and the second user's historic reactions correspond to the first users and the second users heart rate thereby defining a heart rate signature for the first user and the second user, the method comprising:

determining a type of reaction of the first user and the second user by mapping the current measurement of the first users and the second users heart rate onto the heart rate signature.

4. The method of claim 1, further comprising:

in response to determining that the first psychological characteristic of the first user does not match the first user's preference for the first psychological characteristic identified in a profile of the first user, activating a facial recognition system and/or a gesture recognition system;

monitoring one or more facial expressions of the first user and/or one or more gestures of the first user; and determining a type of user reaction corresponding to the first psychological characteristic of the first user.

5. The method of claim 4, further comprising:

outputting a notification requesting input from the first user to confirm the determined type of reaction.

6. The method of claim 1, further comprising:

based at least in part on determining that the first psychological characteristic of the first user does not match the first user's preference for the first psychological characteristic identified in a profile of the first user, accessing a user profile associated with the first user to determine the first users preference for the media content item displayed at the device; and modifying the media content item based at least in part on the user preference for the media content item.

7. The method of claim 1, wherein the media content item is an interactive media content item having a plurality of program content options available for viewing by the first user and the second user, wherein modifying the media content item comprises selecting one of the plurality of program content options in response to determining the first psychological characteristic of the first user does not match the first user's preference for the first psychological characteristic identified in a profile of the first user.

8. The method of claim 7, the method further comprising:

determining one or more tags relating to content of at least one of the plurality of program content options available for viewing by the first user; and selecting one of the plurality of program content options based on the one or more tags and the determined first psychological characteristic of the first user not matching the first user's preference for the first psychological characteristic identified in a profile of the first user.

9. The method of claim 8, wherein selecting one of the plurality of program content options available for viewing by the user comprises:

generating for display a list of user-selectable display icons corresponding to the plurality of program content options available for viewing by the first user and the second user, wherein the list is ordered based on the one or more tags and the determined first psychological characteristic of the first user not matching the first user's preference for the first psychological character-
istic identified in a profile of the first user; and
receiving a user selection of one of the user-selectable
display icons.

10. A system comprising:
control circuitry configured to:
    identify a first device associated with a first user, a
    second device associated with a second user, and a
    shared device displaying a media content item for
    simultaneous consumption by both the first user and
    the second user;
    identify a first psychological characteristic of the first
    user and a second psychological characteristic of the
    second user;
    determine that (a) the first psychological characteristic
    of the first user does not match the first user's
    preference for the first psychological characteristic
    identified in a profile of the first user, and (b) the
    second psychological characteristic of the second
    user matches the second user's preference for the
    second psychological characteristic identified in a
    profile of the second user;
    based at least in part on the determining:
        modify the display of the media content item on the
        shared device to a version of the media content
        item selected to match the first user's preference
        for the first psychological characteristic of the first
        user; and
        cause to be transmitted, to the second device asso-
        ciated with the second user, the media content
        item without modifications.

11. The system of claim 10, wherein the control circuitry
is configured to identify the first psychological characteristic
of the first user and the second psychological characteristic
of the second user, the control circuitry is further configured
to:
    access historic data relating to the first users and the
    second users heart rate measured during previously
    viewed media content; and
    compare a current measurement of the first users and the
    second users heart rate to the historic data.

12. The system of claim 11, wherein the historic data
contains tags relating to how the first user's and the second
user's historic reactions correspond to the first users and the
second users heart rate thereby defining a heart rate signa-
ture for the first user and the second user, the control
circuitry is further configured to:
    determine a type of reaction of the first user and the
    second user by mapping the current measurement of the
    first users and the second users heart rate onto the heart
    rate signature.

13. The system of claim 10, wherein the control circuitry
is further configured to:
    in response to determining that the first psychological
    characteristic of the first user does not match the first
    user's preference for the first psychological characteristic identified in a profile of the first user, activate a
    facial recognition system and/or a gesture recognition
    system;
    monitor one or more facial expressions of the first user
    and/or one or more gestures of the first user; and
    determine a type of user reaction corresponding to the first
    psychological characteristic of the first user.

14. The system of claim 13, wherein the control circuitry
is further configured to:
    output a notification requesting input from the first user to
    confirm the determined type of reaction.

15. The system of claim 10, wherein the control circuitry
is further configured to:
    based at least in part on determining that the first psy-
    chological characteristic of the first user does not match
    the first user's preference for the first psychological
    characteristic identified in a profile of the first user,
    access a user profile associated with the first user to
    determine the first users preference for the media
    content item displayed at the device; and
    modify the media content item based at least in part on the
    user preference for the media content item.

16. The system of claim 10, wherein the media content
item is an interactive media content item having a plurality
of program content options available for viewing by the first
user and the second user, wherein modifying the media
content item comprises selecting one of the plurality of
program content options in response to determining the first
psychological characteristic of the first user does not match
the first user's preference for the first psychological char-
acteristic identified in a profile of the first user.

17. The system of claim 16, wherein the control circuitry
is further configured to:
    determine one or more tags relating to content of at least
    one of the plurality of program content options avail-
    able for viewing by the first user; and
    select one of the plurality of program content options
    based on the one or more tags and the determined first
    psychological characteristic of the first user not match-
    ing the first user's preference for the first psychological
    characteristic identified in a profile of the first user.

18. The system of claim 17, wherein the control circuitry
is configured to select one of the plurality of program
content options available for viewing by the user the control
circuitry is further configured to:
    generate for display a list of user-selectable display icons
    corresponding to the plurality of program content
    options available for viewing by the first user and the
    second user, wherein the list is ordered based on the one
    or more tags and the determined first psychological
    characteristic of the first user not matching the first
    user's preference for the first psychological character-
    istic identified in a profile of the first user; and
    receive a user selection of one of the user-selectable
    display icons.

* * * * *